United States Patent
Bradski

(10) Patent No.: US 9,990,777 B2
(45) Date of Patent: Jun. 5, 2018

(54) PRIVACY-SENSITIVE CONSUMER CAMERAS COUPLED TO AUGMENTED REALITY SYSTEMS

(71) Applicant: Magic Leap, Inc., Dania Beach, FL (US)

(72) Inventor: Gary R. Bradski, Palo Alto, CA (US)

(73) Assignee: MAGIC LEAP, INC., Plantation, FL (US)

(*) Notice: Subject to any disclaimer, the term of this patent is extended or adjusted under 35 U.S.C. 154(b) by 106 days.

(21) Appl. No.: 15/155,000

(22) Filed: May 14, 2016

(65) Prior Publication Data
US 2016/0335802 A1 Nov. 17, 2016

Related U.S. Application Data

(60) Provisional application No. 62/161,665, filed on May 14, 2015.

(51) Int. Cl.
| | |
|---|---|
| *G06T 19/00* | (2011.01) |
| *G06F 3/01* | (2006.01) |
| *H04N 5/225* | (2006.01) |
| *G02B 27/01* | (2006.01) |
| *G02B 27/00* | (2006.01) |

(52) U.S. Cl.
CPC ........ *G06T 19/006* (2013.01); *G02B 27/0093* (2013.01); *G02B 27/017* (2013.01); *G06F 3/013* (2013.01); *H04N 5/2252* (2013.01); *G02B 2027/0138* (2013.01)

(58) Field of Classification Search
CPC .......... G06T 19/006; G02B 2027/0138; G02B 27/0093; G02B 27/017
See application file for complete search history.

(56) References Cited

U.S. PATENT DOCUMENTS

| | | |
|---|---|---|
| 8,933,931 B2 | 1/2015 | Balan et al. |
| 2010/0060632 A1 | 3/2010 | Lefevre et al. |

(Continued)

OTHER PUBLICATIONS

PCT International Search Report and Written Opinion for International Appln. No. PCT/US2016/032580, Applicant Magic Leap, Inc., forms PCT/ISA/210, 220, and 237, dated Aug. 8, 2016(17 pages).

(Continued)

*Primary Examiner* — Michelle L Sams
(74) *Attorney, Agent, or Firm* — Vista IP Law Group LLP

(57) ABSTRACT

An augmented reality display device comprises a housing for one or more components for the augmented reality display device, wherein the one or more components comprises a plurality of sensors to capture information pertaining to the user's surroundings, and wherein at least one sensor of the plurality of sensors is an image-based sensor, a processing module communicatively coupled to the housing to process a set of data retrieved from the plurality of sensors, wherein the processing module comprises a gating mechanism that selectively allows data to be uploaded to the cloud, and a detachable camera removably attached to a housing of the augmented reality display device, such that when the detachable camera is attached to the housing of the augmented reality display device, the gating mechanism is opened such that data retrieved from the detachable camera is uploaded to the cloud.

52 Claims, 16 Drawing Sheets

(56) References Cited

U.S. PATENT DOCUMENTS

| | | |
|---|---|---|
| 2010/0103196 A1 | 4/2010 | Kumar et al. |
| 2010/0182340 A1 | 7/2010 | Bachelder et al. |
| 2012/0142415 A1* | 6/2012 | Lindsay ................ G06T 19/006 463/33 |
| 2012/0212399 A1 | 8/2012 | Border et al. |
| 2013/0174213 A1 | 7/2013 | Liu et al. |
| 2013/0336519 A1* | 12/2013 | Connor ............. G06K 9/00771 382/100 |
| 2014/0210710 A1 | 7/2014 | Shin et al. |
| 2015/0251093 A1* | 9/2015 | Trombetta ............. A63F 13/49 463/24 |

OTHER PUBLICATIONS

Extended European Search Report for EP application No. 16793668.1, dated Apr. 18, 2018, 7 pages.

\* cited by examiner

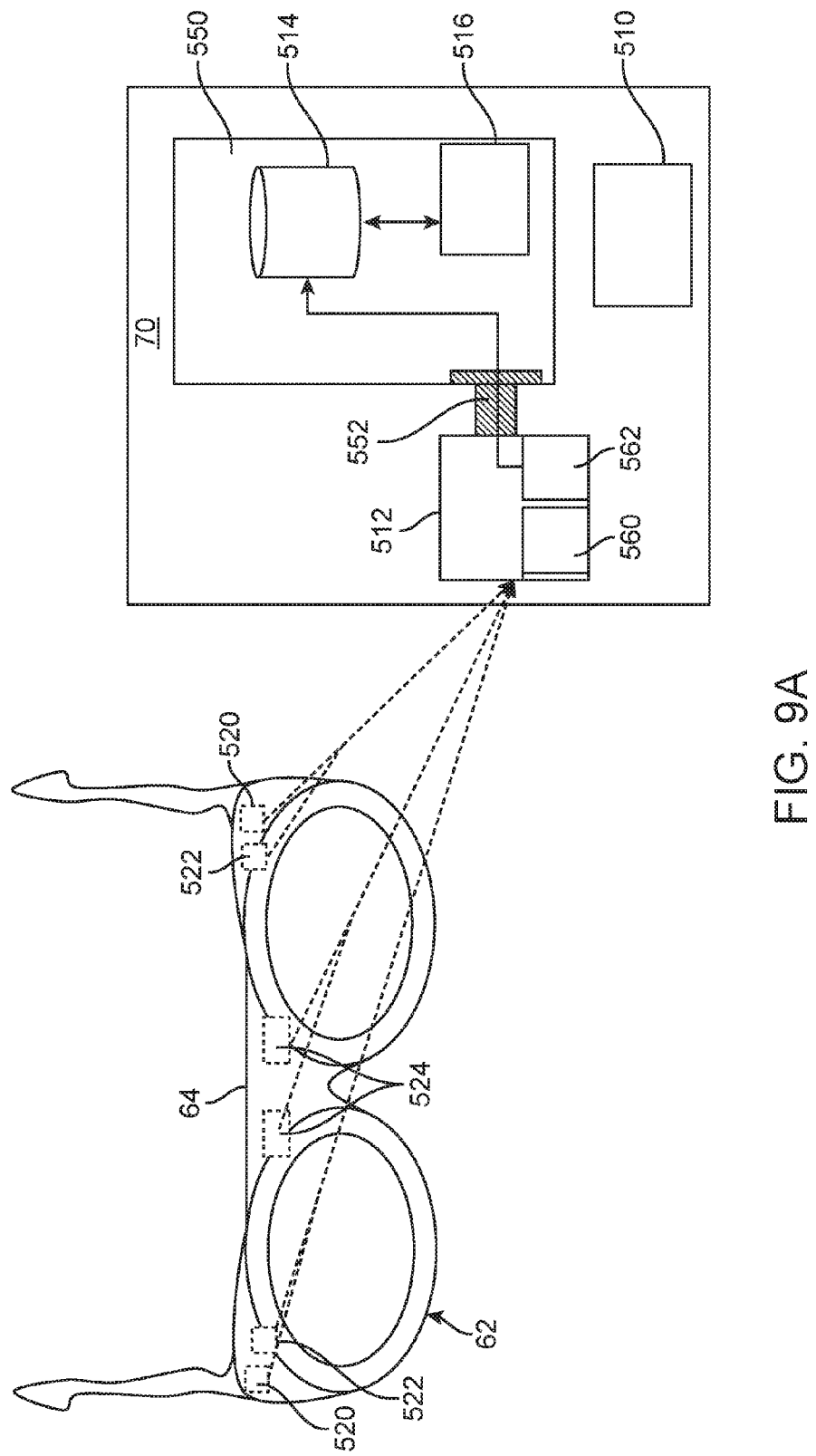

PRIVACY-SENSITIVE CONSUMER CAMERAS COUPLED TO AUGMENTED REALITY SYSTEMS

CROSS-REFERENCE TO RELATED APPLICATION(S)

This application claims priority to U.S. Provisional Application Ser. No. 62/161,665 filed on May 14, 2015 entitled "PRIVACY-SENSITIVE CONSUMER CAMERAS COUPLED TO AUGMENTED REALITY SYSTEMS,". The contents of the aforementioned patent application are hereby expressly incorporated by reference in their entirety for all purposes as though set forth in full.

FIELD OF THE INVENTION

The present disclosure relates to systems and methods to couple one or more consumer cameras to an augmented reality system.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input. An augmented reality, or "AR", scenario typically involves presentation of digital or virtual image information as an augmentation to visualization of the actual world around the user.

For example, referring to FIG. 1, an augmented reality scene is depicted wherein a user of an AR technology sees a real-world park-like setting featuring people, trees, buildings in the background, and a concrete platform 1120. In addition to these items, the user of the AR technology also perceives a robot statue 1110 standing upon the real-world platform 1120, and a cartoon-like avatar character 2 flying by, even though these elements (2, 1110) do not exist in the real world. The human visual perception system is very complex, and producing such an augmented reality scene that facilitates a comfortable, natural-feeling, rich presentation of virtual image elements amongst other virtual or real-world imagery elements is challenging.

A scene similar to that shown in FIG. 1, requires the augmented reality ("AR") system to display virtual content in relation to one or more real objects of the physical world. As an example, if a user wearing a head-worn display views a virtual representation of a three-dimensional (3D) object on the display and walks around the area where the 3D object appears, that 3D object can be re-rendered for each viewpoint, giving the user the perception that he or she is walking around an object that occupies real space. In other words, the AR system must know the coordinates of the real world and display the virtual content in relation to the real world to provide a satisfying augmented reality or virtual reality experience.

To this end, a head worn AR display system (or helmet-mounted displays, or smart glasses, etc.) is configured to capture a set of data regarding the user's surroundings. For example, the AR system may capture a set of images that capture a user's field of view. The AR system may also comprise one or more sensors that capture pose (e.g., user's position and orientation in space), eye tracking cameras to track a vergence of the user's eyes, inertial measurement units IMUs and other such data capturing devices. Together, these cameras and sensors provide various forms of input to the AR display system, which in turn allows the AR system to accurately and timely present virtual content to the user relative to one or more objects of the real world.

Although these cameras and sensors (and other devices that provide input to the AR display system) are crucial in providing users with a realistic augmented reality experience, various concerns related to privacy and security may be raised as a result of collecting these types of data. Users of the AR display system may be wary of the type of images (e.g., pictures of private moments, pictures of children, nude pictures, confidential matters, secret pictures, etc.) being captured by the AR device without the user's consent. For example, a user of the AR display system may be present with young kids, but may have privacy concerns over images of the young kids being unknowingly captured and being transmitted to other users and/or a provider of AR technology. These privacy challengers are real and sensitive issues for most people, and may have the effect of deterring users from safely using the AR display device if not properly resolved.

There, thus, is a need for a better solution to ensure an AR user's privacy while using AR or VR devices.

SUMMARY

Embodiments of the present invention are directed to devices, systems and methods for facilitating virtual reality and/or augmented reality interaction for one or more users.

In one aspect, an augmented reality display system comprises a housing for one or more components for the augmented reality display system, wherein the one or more components comprises at least a spatial light modulator to project light associated with one or more virtual images to a user and a plurality of sensors to capture information pertaining to the user's surroundings, and wherein at least one sensor of the plurality of sensors is an image-based sensor, a processing module communicatively coupled to the housing to process a set of data retrieved from the plurality of sensors, wherein the processing module comprises a gating mechanism that selectively allows the set of data retrieved from the plurality of sensors to be transmitted to a mobile platform, and a detachable camera removably attached to the housing of the augmented reality display system, wherein the gating mechanism selectively allows the set of data retrieved from the plurality of sensors to pass through to the mobile platform based at least in part on whether the detachable camera is detected to be attached to the housing of the augmented reality display system.

In one or more embodiments, when the detachable camera is detected to be attached to the housing of the augmented reality display system, the gating mechanism allows the set of data to pass through to the mobile platform. In one or more embodiments, when the detachable camera is not detected to be attached to the housing of the augmented reality display system, the gating mechanism allows only a portion of the set of data to pass through to the mobile platform. In one or more embodiments, at least some of the set of data retrieved from the plurality of sensors corresponds to image or video data.

In one or more embodiments, the augmented reality display system further comprises a VPU that extracts geometric information from a set of images corresponding to the set of data retrieved from the plurality of sensors. In one or more embodiments, when the detachable camera is not detected to be attached to the housing of the augmented reality display system, the gating mechanism allows the geometric information to pass through to the mobile platform, but prevents the set of images from passing through to the mobile platform.

In one or more embodiments, when the detachable camera is detected to be attached to the housing of the augmented reality display system, the gating mechanism allows the geometric information and the set of images captured when the detachable camera is detected to be attached to the augmented reality display system to pass through to the mobile platform. In one or more embodiments, the geometric information corresponds to pose information pertaining to the set of images. In one or more embodiments, the geometric information corresponds to 2D or 3D points pertaining to the set of images.

In one or more embodiments, the geometric information corresponds to depth information pertaining to the set of images. In one or more embodiments, the geometric information is transmitted to a map database, the map database comprising coordinate information of real objects of the world, such that virtual content is displayed to the user in relation to the real objects of the world. In one or more embodiments, the VPU comprises an image storage module to store images captured through the plurality of sensors.

In one or more embodiments, the VPU comprises a geometry storage module to store the geometric information pertaining to the images captured through the plurality of sensors. In one or more embodiments, the gating mechanism allows geometric information to be passed through to the mobile platform even when the detachable camera is not detected to be attached to the housing of the augmented reality display system.

In one or more embodiments, the augmented reality display system further comprises a camera storage module to store images captured through the detachable camera. In one or more embodiments, when the detachable camera is not detected to be attached to the housing of the augmented reality display system, the camera storage module does not transmit the images to mobile platform. In one or more embodiments, when the detachable camera is detected to be attached to the housing of the augmented reality display system, the camera storage module transmits the images captured while the detachable camera is detected to be attached to the mobile platform.

In one or more embodiments, the detachable camera comprises an indicator that signals that the detachable camera has been attached to the housing of the augmented reality display system. In one or more embodiments, the indicator comprises a light that is turned on when the detachable camera has been attached to the housing of the augmented reality display system. In one or more embodiments, the indicator is a shutter that physically opens or blocks the lens of the detachable camera.

In one or more embodiments, the detachable camera is a third-party camera. In one or more embodiments, the detachable camera is electrically attached to the housing of the augmented reality device is an electrical means. In one or more embodiments, the detachable camera is mechanically attached to the housing of the augmented reality device is a mechanical means. In one or more embodiments, the augmented reality display system further comprises an electrical contact that completes a circuit when the detachable camera is attached to the detachable camera to detect that the detachable camera has been attached to the housing of the augmented reality display system.

In one or more embodiments, the plurality of sensors comprises an IMU device. In one or more embodiments, the plurality of sensors comprises an eye-tracking device. In one or more embodiments, the plurality of sensors comprises a depth camera. In one or more embodiments, the plurality of sensors comprises a field-of-view camera. In one or more embodiments, the plurality of sensors comprises an infrared camera.

In another aspect, a method for displaying augmented reality comprises projecting, through a spatial light modulator, one or more virtual images to a user, capturing, through a plurality of sensors, a set of data pertaining to the user's surroundings, wherein the set of data includes an image, processing, through a processing module, the set of data retrieved from the plurality of sensors, the processing module comprising a gating mechanism that selectively allows the set of data retrieved from the plurality of sensors to be transmitted to a mobile platform, detecting whether a detachable camera is attached to a housing of the augmented reality device, wherein the gating mechanism selectively allows the set of data retrieved from the plurality of sensors to be transmitted to the mobile platform based at least in part on whether the detachable camera is detected to be attached to the housing of the augmented reality display system.

In one or more embodiments, the method further comprises when the detachable camera is detected to be attached to the housing of the augmented reality display system, the gating mechanism allowing the set of data to pass through to the mobile platform. In one or more embodiments, the method further comprises when the detachable camera is not detected to be attached to the housing of the augmented reality display system, the gating mechanism allowing only a portion of the set of data to pass through to the mobile platform.

In one or more embodiments, at least some of the set of data retrieved from the plurality of sensors corresponds to image or video data. In one or more embodiments, the method further comprises extracting, through a VPU, geometric information from a set of images corresponding to the set of data retrieved from the plurality of sensors. In one or more embodiments, the method further comprises when the detachable camera is not detected to be attached to the housing of the augmented reality display system, the gating mechanism allowing the geometric information to pass through to the mobile platform.

In one or more embodiments, the method further comprises when the detachable camera is detected to be attached to the housing of the augmented reality display system, the gating mechanism allowing the geometric information and the set of images captured when the detachable camera is detected to be attached to the augmented reality display system to pass through to the mobile platform. In one or more embodiments, the geometric information corresponds to pose information pertaining to the set of images.

In one or more embodiments, the geometric information corresponds to 2D or 3D points pertaining to the set of images. In one or more embodiments, the geometric information corresponds to depth information pertaining to the set of images. In one or more embodiments, the method further comprises transmitting the geometric information to a map database, the map database comprising coordinate information of real objects of the world, such that virtual content is displayed to the user in relation to the real objects of the world.

In one or more embodiments, the VPU comprises an image storage module to store images captured through the plurality of sensors. In one or more embodiments, the VPU comprises a geometry storage module to store the geometric information pertaining to the images captured through the plurality of sensors. In one or more embodiments, the method further comprises the gating mechanism allowing geometric information to be passed through to the mobile platform even when the detachable camera is not detected to be attached to the housing of the augmented reality display system.

In one or more embodiments, the method further comprises storing images captured through the detachable camera in a camera storage module. In one or more embodiments, when the detachable camera is not detected to be attached to the housing of the augmented reality display system, the camera storage module does not transmit the images to mobile platform. In one or more embodiments, the method further comprises when the detachable camera is detected to be attached to the housing of the augmented reality display system, the camera storage module transmitting the images captured while the detachable camera is detected to be attached to the mobile platform.

In one or more embodiments, wherein the detachable camera comprises an indicator that signals that the detachable camera has been attached to the housing of the augmented reality display system. In one or more embodiments, the indicator comprises a light that is turned on when the detachable camera has been attached to the housing of the augmented reality display system. In one or more embodiments, the indicator comprises a shutter that physically opens or blocks the lens of the detachable camera.

In one or more embodiments, the method further comprises electrically attaching the detachable camera to the housing of the augmented reality device. In one or more embodiments, the method further comprises mechanically attaching the detachable camera to the housing of the augmented reality device. In one or more embodiments, the method further comprises detecting the detachable camera based at least in part on an electrical contact that completes a circuit when the detachable camera is attached to the detachable camera.

Additional and other objects, features, and advantages of the invention are described in the detail description, figures and claims.

BRIEF DESCRIPTION OF THE DRAWINGS

The drawings illustrate the design and utility of various embodiments of the present invention. It should be noted that the figures are not necessarily drawn to scale and that elements of similar structures or functions are represented by like reference numerals throughout the figures. In order to better appreciate how to obtain the above-recited and other advantages and objects of various embodiments of the invention, a more detailed description of the present invention briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 9A-9B illustrate another series of process flow diagrams depicting another example technique of selectively transmitting information to the mobile platform, according to one embodiment.

DETAILED DESCRIPTION

Referring to FIGS. 2A-2D, some general componentry options are illustrated. In the portions of the detailed description which follow the discussion of FIGS. 2A-2D, various systems, subsystems, and components are presented for addressing the objectives of providing a high-quality, comfortably-perceived display system for human VR and/or AR.

Figure 1:
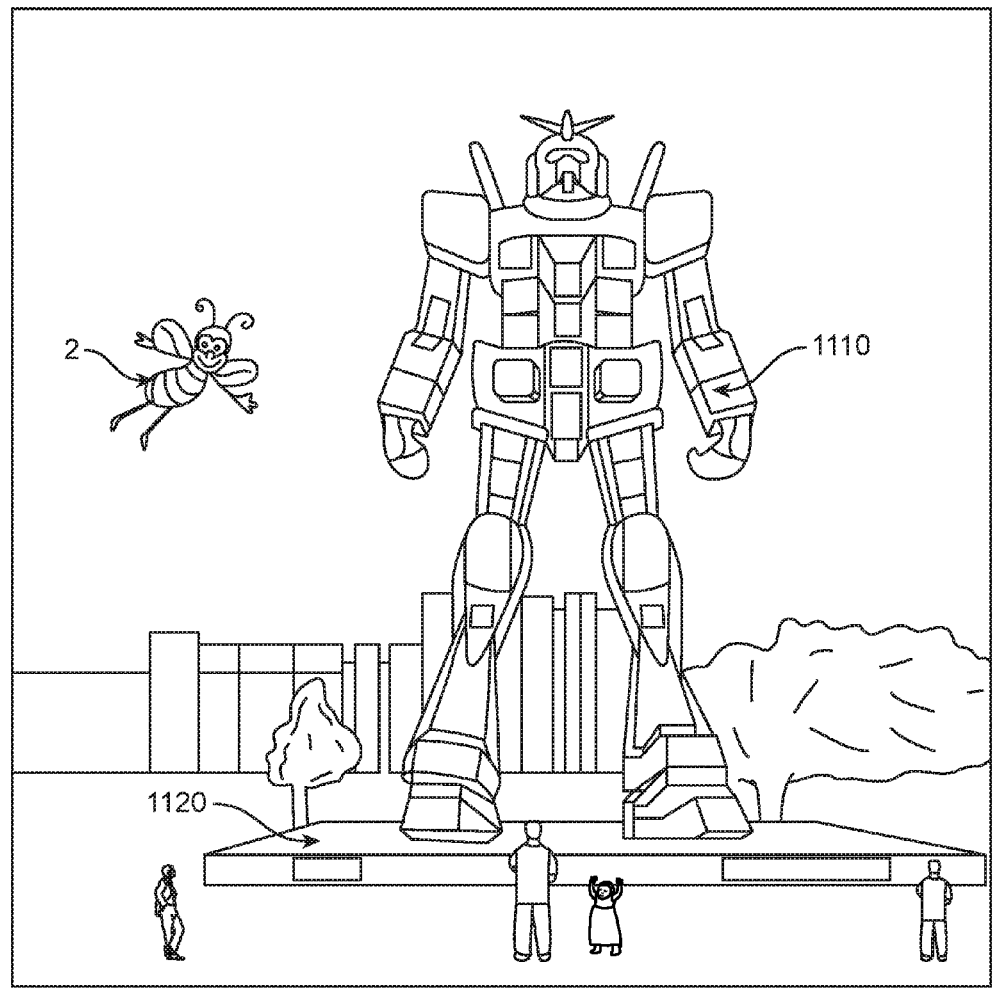
FIG. 1 illustrates an example augmented reality scene being displayed to a user.
Figure 2A:
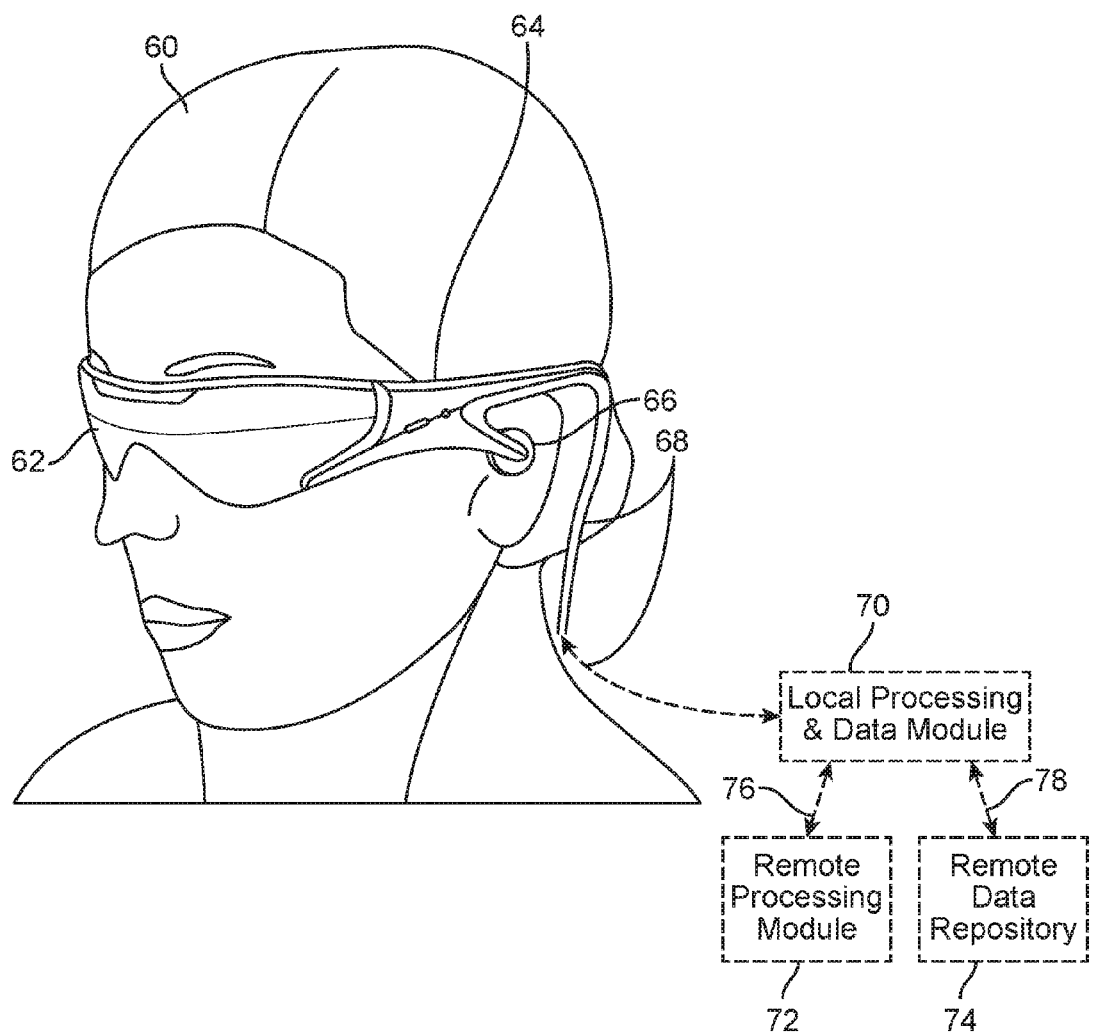
FIG. 2A-2D illustrates various configurations of an example augmented reality device.
Figure 2B:
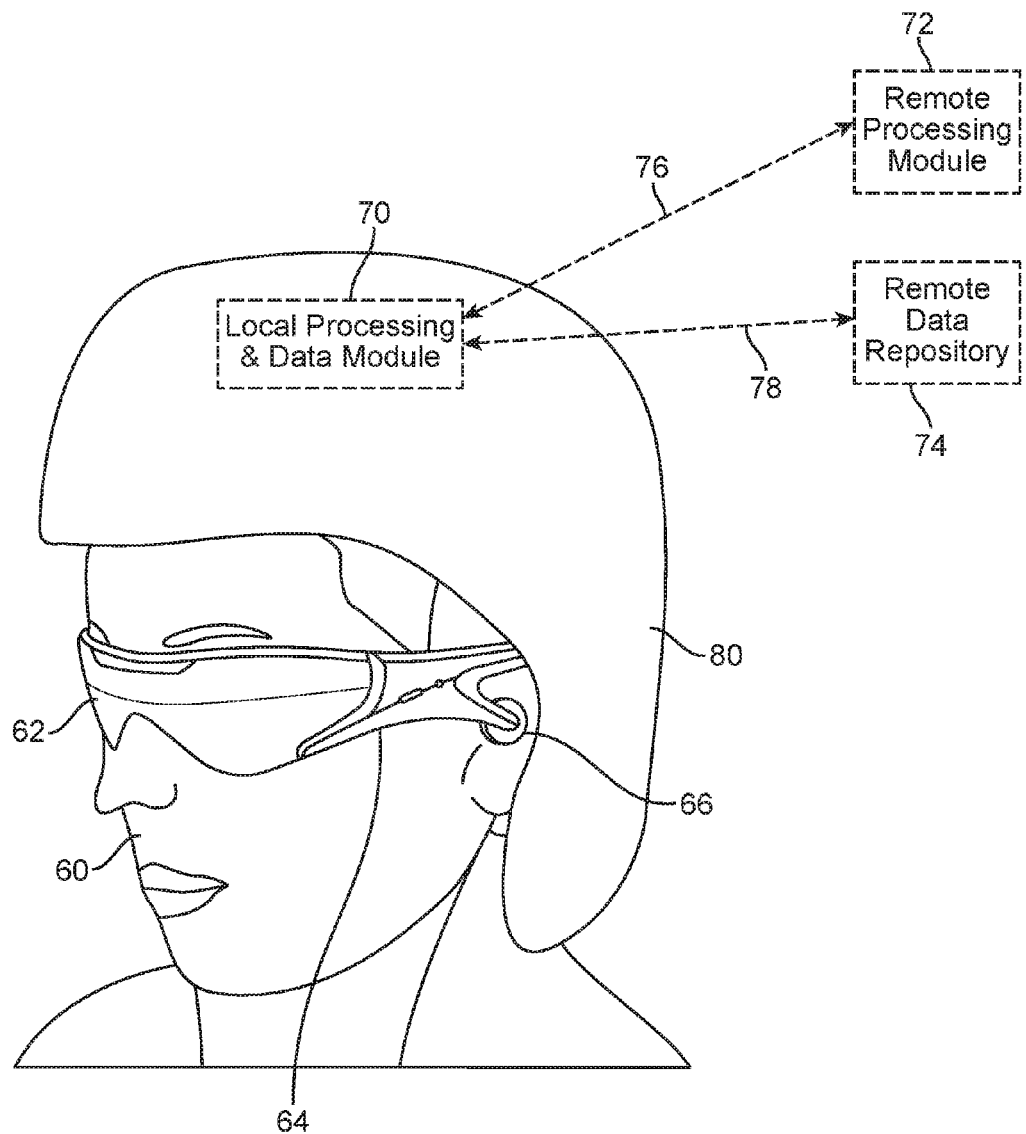
Figure 2C:
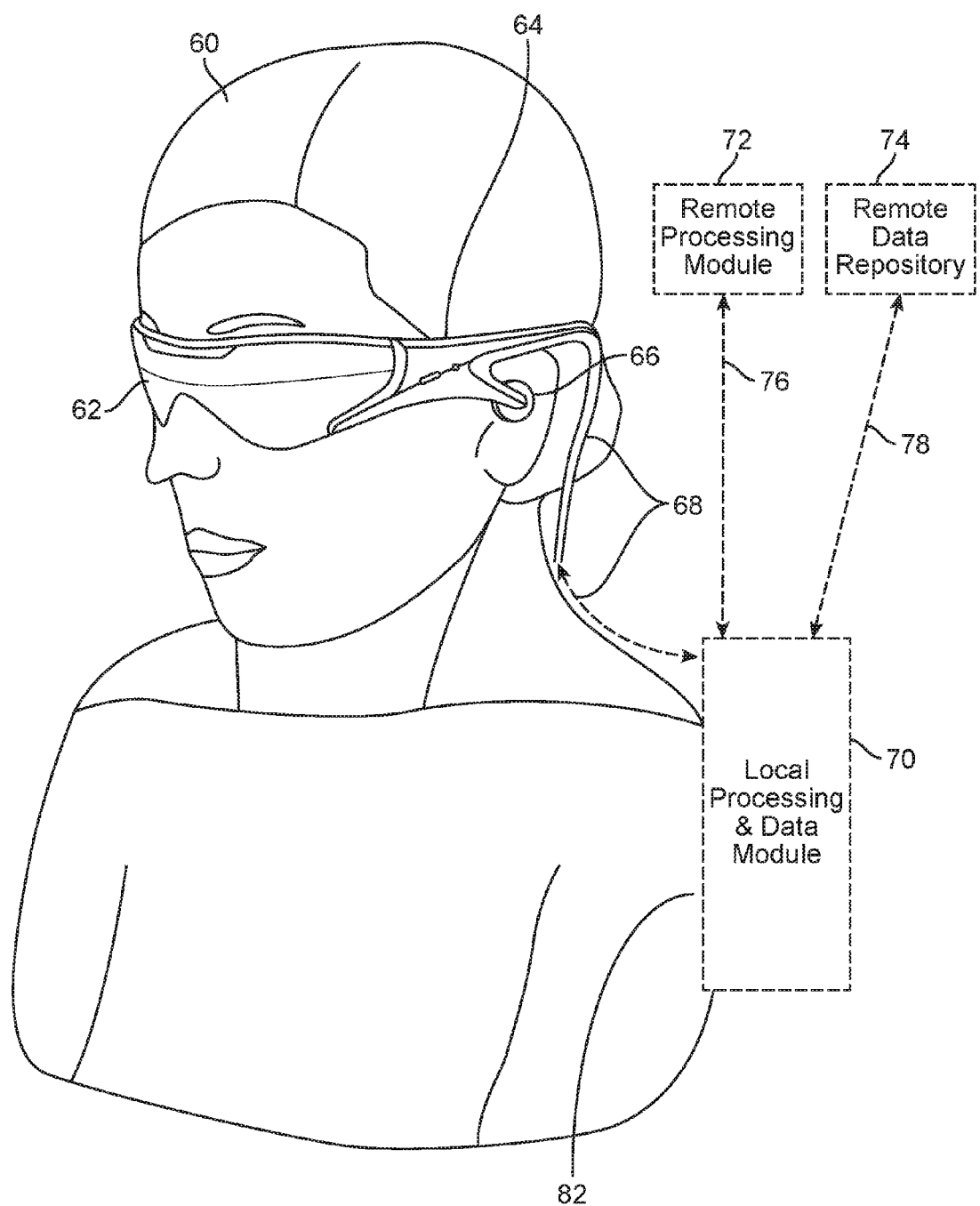
Figure 2D:
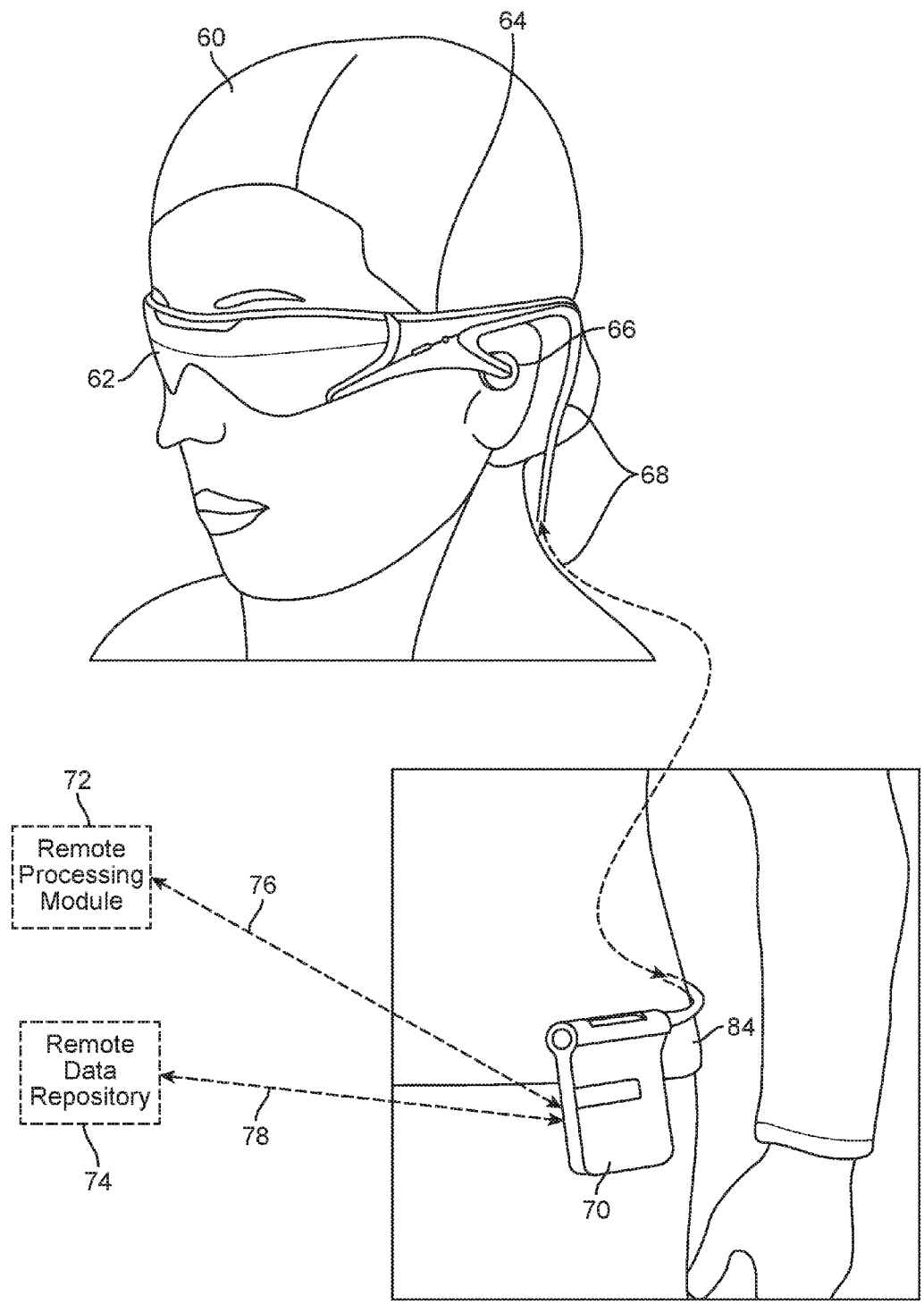

As shown in FIG. 2A, an AR system user 60 is depicted wearing a frame 64 structure coupled to an AR display system 62 positioned in front of the eyes of the user. A speaker 66 is coupled to the frame 64 in the depicted configuration and positioned adjacent the ear canal of the user (in one embodiment, another speaker, not shown, is positioned adjacent the other ear canal of the user to provide for stereo/shapeable sound control). The display 62 is operatively coupled 68, such as by a wired lead or wireless connectivity, to a local processing and data module 70 which may be mounted in a variety of configurations, such as fixedly attached to the frame 64, fixedly attached to a helmet or hat 80 as shown in the embodiment of FIG. 2B, embedded in headphones, removably attached to the torso 82 of the user 60 in a backpack-style configuration as shown in the embodiment of FIG. 2C, or removably attached to the hip 84 of the user 60 in a belt-coupling style configuration as shown in the embodiment of FIG. 2D.

The local processing and data module 70 may comprise a power-efficient processor or controller, as well as digital memory, such as flash memory, both of which may be utilized to assist in the processing, caching, and storage of data a) captured from sensors which may be operatively coupled to the frame 64, such as image capture devices (such as cameras), microphones, inertial measurement units, accelerometers, compasses, GPS units, radio devices, and/or gyros; and/or b) acquired and/or processed using the remote processing module 72 and/or remote data repository 74, possibly for passage to the display 62 after such processing or retrieval. The local processing and data module 70 may be operatively coupled (76, 78), such as via a wired or wireless communication links, to the remote processing module 72 and remote data repository 74 such that these remote modules (72, 74) are operatively coupled to each other and available as resources to the local processing and data module 70.

In one embodiment, the remote processing module 72 may comprise one or more relatively powerful processors or controllers configured to analyze and process data and/or image information. In one embodiment, the remote data repository 74 may comprise a relatively large-scale digital data storage facility, which may be available through the Internet or other networking configuration in a "cloud" resource configuration. In one embodiment, all data is stored and all computation is performed in the local processing and data module, allowing fully autonomous use without any remote modules.

Figure 3:
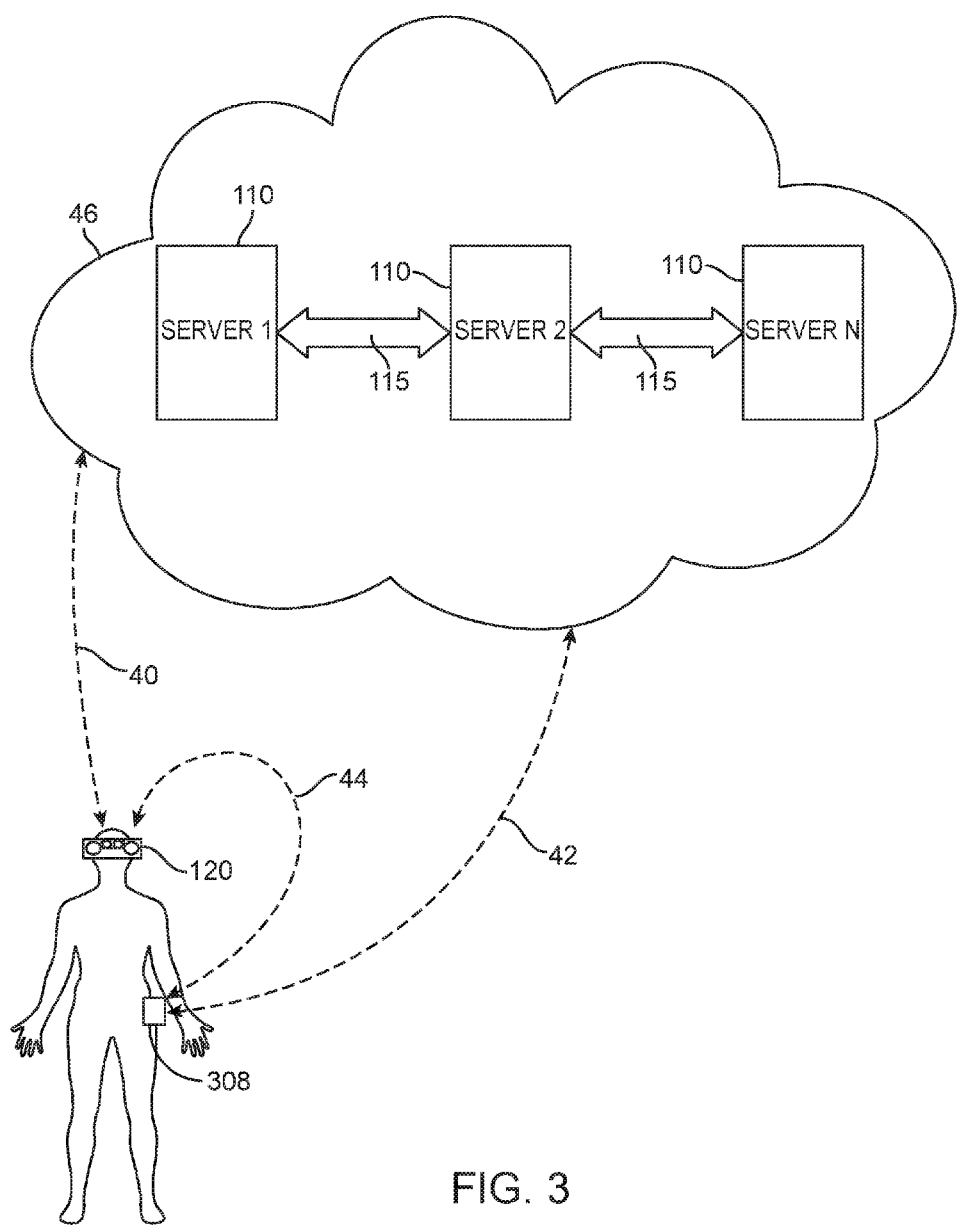
FIG. 3 illustrates an augmented reality device communicating with one or more servers in the cloud, according to one embodiment.

As described with reference to FIGS. 2A-2D, the AR system continually receives input from various devices that collect data about the AR user and the surrounding environment. Referring now to FIG. 3, the various components of an example augmented reality display device will be described. It should be appreciated that other embodiments may have additional components. Nevertheless, FIG. 3 provides a basic idea of the various components, and the types of data that may be collected by AR device.

Referring now to FIG. 3, a schematic illustrates coordination between the cloud computing assets 46 and local processing assets (308, 120). In one embodiment, the cloud 46 assets are operatively coupled, such as via wired or wireless networking (wireless being preferred for mobility, wired being preferred for certain high-bandwidth or high-data-volume transfers that may be desired), directly to (40, 42) one or both of the local computing assets (120, 308), such as processor and memory configurations which may be housed in a structure configured to be coupled to a user's head mounted device 120 or belt 308. These computing assets local to the user may be operatively coupled to each other as well, via wired and/or wireless connectivity configurations 44. In one embodiment, to maintain a low-inertia and small-size head mounted subsystem 120, primary transfer between the user and the cloud 46 may be via the link between the belt-based subsystem 308 and the cloud, with the head mounted subsystem 120 primarily data-tethered to the belt-based subsystem 308 using wireless connectivity, such as ultra-wideband ("UWB") connectivity, as is currently employed, for example, in personal computing peripheral connectivity applications. Through the cloud 46, the AR display system 120 may interact with one or more AR servers 110 hosted in the cloud. The various AR servers 110 may have communication links 115 that allows the servers 110 to communicate with one another.

With efficient local and remote processing coordination, and an appropriate display device for a user, such as a user interface or user "display device", or variations thereof, aspects of one world pertinent to a user's current actual or virtual location may be transferred or "passed" to the user and updated in an efficient fashion. In other words, a map of the world is continually updated at a storage location which may partially reside on the user's AR system and partially reside in the cloud resources. The map (also referred to as a passable world model) may be a large database comprising raster imagery, 3D and 2D points, parametric information and other information about the real world. As more and more AR users continually capture information about their real environment (e.g., through cameras, sensors, IMUs, etc.), the map becomes more and more accurate.

Figure 4:
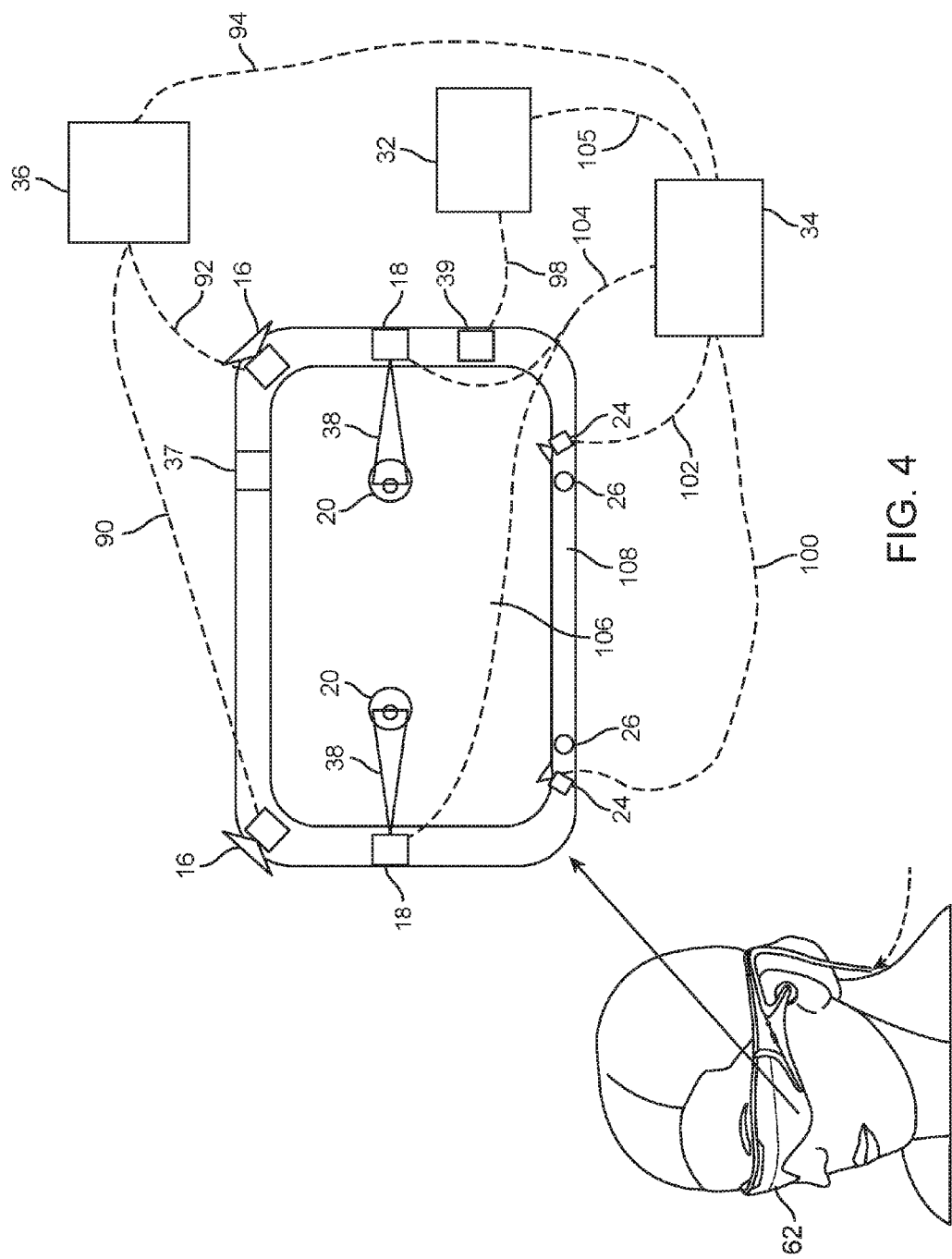
FIG. 4 shows a plan view of various components of an augmented reality device according to one embodiment.

Referring to FIG. 4, one simplified embodiment of a suitable user display device 62 is shown, comprising a display lens 106 which may be mounted to a user's head or eyes by a housing or frame 108. The display lens 106 may comprise one or more transparent mirrors positioned by the housing 108 in front of the user's eyes 20 and configured to bounce projected light 38 into the eyes 20 and facilitate beam shaping, while also allowing for transmission of at least some light from the local environment. In the depicted embodiment, two wide-field-of-view machine vision cameras 16 are coupled to the housing 108 to image the environment around the user; in one embodiment these cameras 16 are dual capture visible light/infrared light cameras.

The depicted embodiment also comprises a pair of scanned-laser shaped-wavefront (i.e., for depth) light projector modules 18 (e.g., spatial light modulators such as DLP, fiber scanning devices (FSDs), LCDs, etc.) with display mirrors and optics configured to project light 38 into the eyes 20 as shown. The depicted embodiment also comprises two miniature infrared cameras 24 paired with infrared light sources 26, such as light emitting diodes "LED"s, which are configured to be able to track the eyes 20 of the user to support rendering and user input. The display system 62 further features a sensor assembly 39, which may comprise X, Y, and Z axis accelerometer capability as well as a magnetic compass and X, Y, and Z axis gyro capability, preferably providing data at a relatively high frequency, such as 200 Hz. The depicted system 62 also comprises a head pose processor 36, such as an ASIC (application specific integrated circuit), FPGA (field programmable gate array), and/or ARM processor (advanced reduced-instruction-set machine), which may be configured to calculate real or near-real time user head pose from wide field of view image information output from the cameras 16. The head pose processor 36 is operatively coupled (90, 92, 94; e.g., via wired or wireless connectivity) to the cameras 16 and the rendering engine 34.

Also shown is another processor 32 configured to execute digital and/or analog processing to derive pose from the gyro, compass, and/or accelerometer data from the sensor assembly 39. The depicted embodiment also features a GPS 37 subsystem to assist with pose and positioning.

Finally, the depicted embodiment comprises a rendering engine 34 which may feature hardware running a software program configured to provide rendering information local to the user to facilitate operation of the scanners and imaging into the eyes of the user, for the user's view of the world. The rendering engine 34 is operatively coupled (105, 94, 100/102, 104; i.e., via wired or wireless connectivity) to the sensor pose processor 32, the image pose processor 36, the eye tracking cameras 24, and the projecting subsystem 18 such that rendered light 38 is projected using a scanned laser arrangement 18 in a manner similar to a retinal scanning display. The wavefront of the projected light beam 38 may be bent or focused to coincide with a desired focal distance of the projected light 38.

The mini infrared cameras 24 may be utilized to track the eyes to support rendering and user input (i.e., where the user is looking, what depth he is focusing; as discussed below, eye vergence may be utilized to estimate depth of focus). The GPS 37, gyros, compass, and accelerometers 39 may be utilized to provide coarse and/or fast pose estimates. The camera 16 images and pose data, in conjunction with data from an associated cloud computing resource, may be utilized to map the local world and share user views with a virtual or augmented reality community.

While much of the hardware in the display system 62 featured in FIG. 4 is depicted as being directly coupled to the housing 108 which is adjacent the display 106 and the eyes 20 of the user, the hardware components depicted may be mounted to or housed within other components, such as a belt-mounted component 70, as shown, for example, in FIG. 2D.

In one embodiment, all of the components of the system 62 featured in FIG. 4 are directly coupled to the display housing 108 except for the image pose processor 36, sensor pose processor 32, and rendering engine 34, and communication between the latter three and the remaining components of the system may be by wireless communication, such as ultra wideband, or wired communication. The depicted housing 108 preferably is head-mounted and wearable by the user. It may also feature speakers, such as those which may be inserted into the ears of a user and utilized to provide sound to the user.

Having described the principle components of a standard AR device, it should be appreciated that the AR device may comprise many components that are configured to collect data from the user and his/her surroundings. For example, as described above, some embodiments of the AR device collect GPS information to determine a location of the user. In other embodiments, the AR device comprises infrared cameras to track the eyes of the user. In yet other embodiments, the AR device may comprise field-of-view cameras to capture images of the user's environment, which may, in turn, be used to construct a map (contained in one of the servers 110, as described in FIG. 3) of the user's physical space, which allows the system to render virtual content in relation to appropriate real-life objects, as described briefly with respect to FIG. 3.

While these cameras and sensors described above are integral to provide a realistic augmented reality experience to the user, some users may express privacy concerns over the continually captured image data. For example, the AR user may be playing an educational game with young kids while giving them a bath, but may hesitate to use the AR system for fear that sensitive images or data of the user's kids are transmitted to the larger AR system, and/or to other users. Or, a user (AR user or non-AR user) may be at a public place, but may be wary of getting captured through AR devices used by other persons at the public place. Similarly, other such privacy concerns may be envisioned.

Additionally, one of the central goals of AR systems is to provide an uninterrupted augmented reality experience, without forcing the AR user to discontinue use every time the user occupies a potentially private space or sensitive space (e.g., bathroom, bedroom, surrounded by children, public space, etc.). Another goal of the AR system is to provide the user with the ability to capture photographs through the AR device. This may be an especially popular functionality that is associated with AR devices because it may enable users to capture views/videos that the user is typically unable to capture through the use of a regular camera (e.g., hands-free, panoramic shots, action shots, continuous footage, etc.). This disclosure provides one approach of satisfying these goals described above in a manner that is cognizant of and sensitive to privacy and security concerns of the AR user and society at large.

To this end, in one or more embodiments, an architecture of the AR system may be designed such that data captured from one or more sensors, infrared cameras, depth view cameras of the AR system (i.e., context providing devices) are channeled such that only a geometry information (e.g., pose information, position of objects, 2D and 3D points, parametric information) extracted from a set of images and/or sensor data are provided to a mobile platform of the AR device. In one or more embodiments, mobile platform of the AR device comprises (or accesses) a map (e.g., gaming platform, passable world model, map of the world) that may be stored and continually built on in one of the servers 110 as shown in FIG. 3. The map may be a database containing map data for the world. In one embodiment, it may partly reside on user-wearable components, and may partly reside at cloud storage (e.g., servers 110 of FIG. 3) locations accessible by wired or wireless network. The map is a significant and growing component which will become larger and larger as more and more users are on the system. The map may comprise a set of raster imagery, point and descriptors clouds and polygonal/geometric definitions corresponding to one or more objects of the real world. The map is constantly updated with information received from multiple augmented reality devices, and becomes increasingly accurate over time.

In one or more embodiments, a gating mechanism may be implemented that selectively allows only geometry information gathered from the context providing devices (e.g., infrared cameras, field of view cameras, depth cameras, eye tracking sensors, gyroscopes, accelerometers, etc.) to be transmitted to the map, but ensures that any images or videos captured as part of the context gathering are excluded. However, a designated camera may be detachably coupled to the AR device from time to time when the AR user wants to actively capture images, as will be described in detail below. This approach advantageously empowers the AR user with greater control over images that are being captured from his own AR device, and at the same time, also has the effect of providing notice (through a more conspicuous camera) of possible image or video capture of other AR devices being used in a public space.

Figure 5:
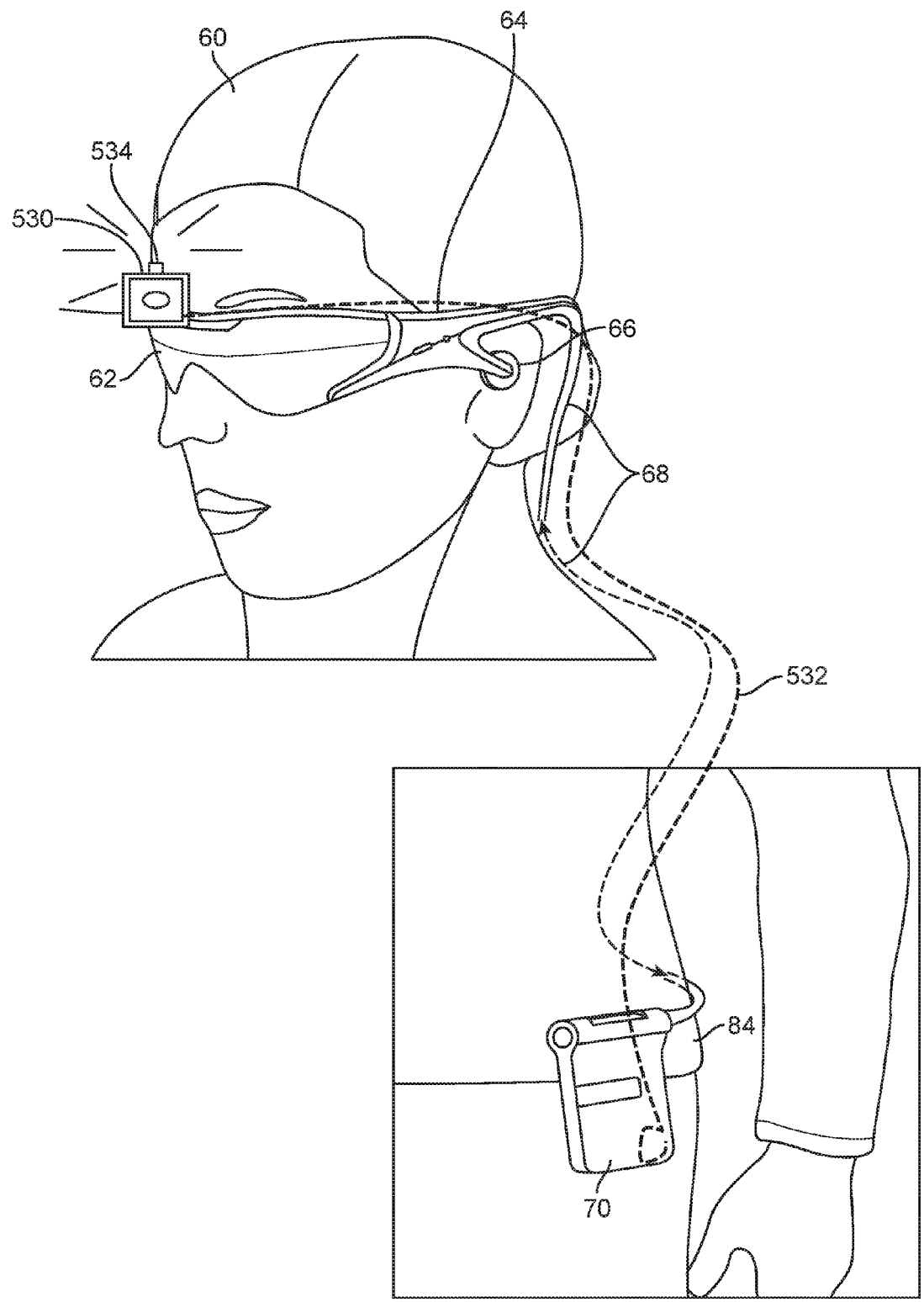
FIG. 5 shows a plan view of the detachable camera affixed to the head-mounted augmented reality device, according to one embodiment.

Referring now to FIG. 5, in one or more embodiments, the AR system may comprise a detachable camera 530 that may be affixed to a hook or some type of fastening device on the frame 64 of the AR device 62. Thus, when the camera 530 is physically attached in a conspicuous manner such as that shown in FIG. 5, other AR users and/or the public at large are put on notice that the AR user wearing the camera 530 may be capturing images and/or recording videos. Upon seeing that someone may be capturing an image, other users or members of the public may behave appropriately or opt not to be captured by the camera device 530. Or, the AR user may be requested not to capture images or record videos in some environments. Most importantly, the camera 530 is conspicuously attached to the AR device such that it is easily noticeable by others so they can be aware of possible image or video capture. This solves the problem of AR users secretly capturing sensitive images or videos without the knowledge of other members of the AR community. A removable camera 530 such as the one shown in FIG. 5 displays the camera 530 in plain view such that people can behave responsibly or alter their behavior, knowing that they may be captured digitally by the AR device.

In one or more embodiments, the detachable camera 530 may be physically coupled to the frame 64 of the AR device 62 by a physical means (e.g., a hook, a magnet, an electrical connection, sensor, etc.). In one or more embodiments, the AR device 62 comprises an electrical connection that is switched on based at least in part on detecting that the detachable camera 530 has been physically affixed to the AR system 62. This detection may occur through an electrical contact that is activated when the detachable camera 530 is attached to the frame 64, and completes a circuit, in one or more embodiments. This detection, in turn, allows the gating mechanism (as will be described in further detail below) to either allow all images to pass through or only selectively allow geometrical information to pass through to the mobile platform.

In one or more embodiments, the detachable camera 530 may be stored at the belt pack 70, and attached to the frame 64 of the AR device 62 whenever needed. In one or more embodiments, the detachable camera 530 may be connected to a power source at the belt pack 70, and physically connected to the frame 64 of the AR device 62 through a wire 532. In other embodiments, the detachable camera 530 may wirelessly communicate with the belt pack 70 and/or a power source at the belt pack 70 without a physical attachment. In yet other embodiments, the detachable camera 530 may be powered at the AR device 62 itself when affixed to the frame 64 of the AR device 62. It should be appreciated that FIG. 5 is provided for illustrative purposes only, and other embodiments may be similarly used. In other embodiments, the detachable camera 530 may be attached to a helmet or some other part of the user's head, but may be physically connected to the frame 64 of the AR device through a hook or other fastening means.

In one or more embodiments, the detachable camera 530 may denote through a light 534 or some other signaling means that the camera has been turned on. In other embodiments, by virtue of the camera 530 being fixed to the AR devices 62, users are automatically put on notice that the AR user may be recording and/or capturing images. Or, in yet other embodiments, the detachable camera 530 may be a camera 530 that has a physical shutter (not shown) that may be opened when the user is recording or capturing an image.

In one or more embodiments, the detachable camera 530 may be manufactured by any third party and may be bought off the shelf and configured to function with the AR device 62. This advantageously gives the AR user greater freedom in the type and quality of images captured by the detachable camera 530. For example, some AR users may be interested in a portable SLR camera that captures better quality pictures when compared to standard digital cameras. Or, some AR users may purchase a specialty wide-view camera 530 that may be affixed to the AR frame 64 to capture panoramic view. Or, AR users may purchase a sports camera 530 to capture high quality sports shots when skiing or sky diving. By decoupling the detachable camera 530 to the AR device 62, the user is provided with greater autonomy in selecting a camera 530 of his/her choosing.

Figure 6:
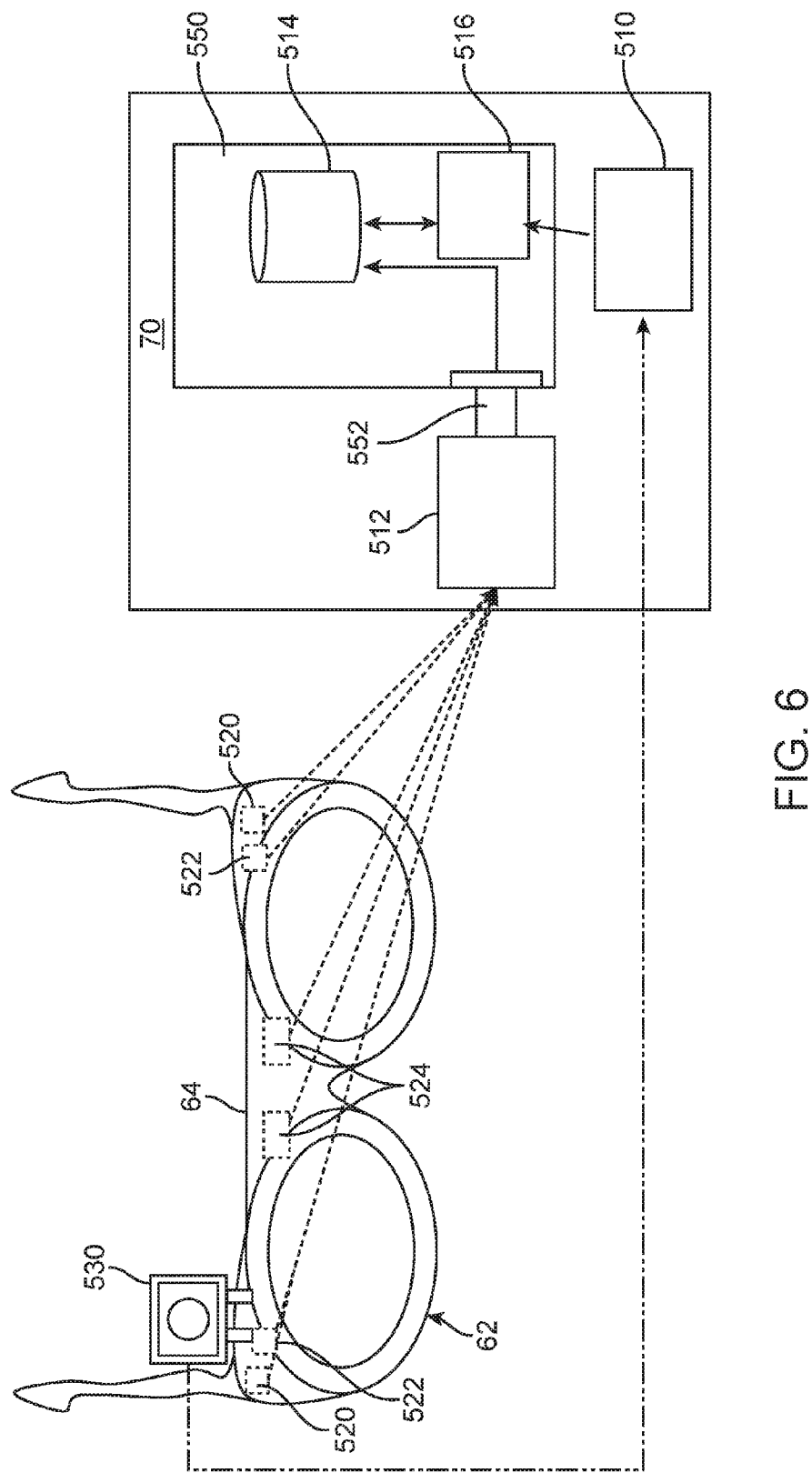
FIG. 6 is a system view of the detachable camera and other components of the head-mounted augmented reality device communicating with the processing module of the belt pack, according to one embodiment.

Referring now to FIG. 6, an embodiment of the system architecture of the AR device 62 with the detachable camera 530 is illustrated. As discussed in some detail above, in order to ensure the AR user's privacy, the architecture of the AR system may be designed such that images are stored (e.g., in a map database or local storage) or transmitted to the server(s) only when the detachable camera 530 is detected to be affixed to the AR device 62. In other words, a gating mechanism may be implemented such that unless the detachable camera is detected, only geometric information (e.g., pose, 3D points, etc.) is transmitted to the server.

As shown in FIG. 6, the AR device 62 may comprise a set of context gathering devices, such as the IMUs 522, depth cameras 520 and infrared cameras 524. It should be appreciated that other AR devices may comprise other such sensors and/or cameras designed for other purposes. As shown in FIG. 6, data collected through these devices (520, 522, 524) are transmitted to a processor 516, which may reside at the belt pack 70 as illustrated. In other embodiments, the processor 516 may reside in another part of the AR system, or be part of the frame 64.

The detachable camera 530 may be physically attached to the frame 64 of the AR device 62 in one or more embodiments. Data captured by the detachable camera 530 is also transmitted to the belt pack 70. In one or more embodiments, image data captured through the detachable camera 530 may be stored directly in a camera storage module 510. In one or more embodiments, the processing components of the belt pack 70 may comprise a video processing module (VPU) 512 to process a set of images captured by the AR device 62. In one or more embodiments, the VPU 512 processes images received from the various cameras, and extracts geometry information from the images. Data from the IMUs 522, depth cameras 520, field of view cameras 530 and infrared cameras 524 may be sent directly to the VPU, which in turn analyzes the data to extract geometry information from the data. In some embodiments, data from the detachable camera 530 may also be sent to the VPU 512 (not shown).

In one or more embodiments, the images from the detachable camera 530 may be stored in separate camera storage module 510. In other embodiments, images from all the image devices of the AR system 62 may also be stored in camera storage module 510. In some embodiments, the VPU 512 is operatively linked to the camera storage module 510 to receive images and extract geometry information. In other embodiments, to ensure privacy, the camera storage module 510 may be kept entirely separate from the VPU 512 to create a physical separation between the actual images, and the geometry information extracted from the images.

If it is detected that the detachable camera 530 is affixed to the frame 64, the captured images may be transmitted to the mobile platform 550 through the gating mechanism 552, or directly from the camera storage module 510. If no detachable camera 530 is detected, only geometry information is passed along to the mobile platform 550 through the gating mechanism 552. As shown in FIG. 6, a gating mechanism 552 exists in between the VPU 512 and the mobile platform 550 being used at the belt pack 70 (e.g., Android®, etc.) and the rest of the processing components of the AR device. This segregation of data is especially designed to ensure that private data (e.g., images, videos, etc.) is not unnecessarily transferred to the mobile platform 550 and/or other resources without the user's consent.

It should be appreciated that the belt pack 70 may comprise other components, and the components detailed here are for illustrative purposes only. In one or more embodiments, the mobile platform 550 connects to one or more cloud resources that allow the AR device 62 to communicate with the map database 514. The map database 514 may be connected to a processor 516 that may be configured to collect, analyze or process the received data, and communicate with the map 514. In one or more embodiments, the map 514 may be a gaming engine such that it comprises mapping data (e.g., physical coordinates, points, etc.) pertaining to the world. In other embodiments, the map 514 may be a passable world model that is constructed from images and points collected by multiple AR users, and that is constructed over time.

The map 514 is an essential component of the AR system that identifies physical coordinates of the AR user in relation to the world. This allows the AR system to render virtual content in relation to one or more real objects of the world. Thus, the exchange of information between the map 514 and the AR device 62 is crucial. The gating mechanism 552 ensures that important geometric information that helps the AR system with its core functionalities is timely transferred to the mobile platform 550 and the map 514, but at the same time also ensures that the images and videos are not transferred to the mobile platform 550 without the user's explicit consent (e.g., through affixation of the detachable camera 530).

In one or more embodiments, when the AR system detects that the detachable camera 530 has been fixed to the frame of the AR device 62 (e.g., through a physical contact, physical token, electrical contact, proximity detector, etc.), the gating mechanism 552 opens, transmitting not only geometric information but also the images to the mobile platform 550. When it is detected that the detachable camera 530 is no longer affixed to the frame 64, the gating mechanism 552 closes the gate such that only geometry is passed through the gate. In one or more embodiments, data from the camera storage module 510 also passes through the gating mechanism 552.

In other embodiments, the camera storage module 510 (which may have a separate processor) is kept separate from the VPU 512, such that data from the camera storage module 510 is freely transmitted to the mobile platform 550. In yet other embodiments, the gating mechanism 552 is always "on" such that only geometry information passes through the gate, even when the detachable camera 530 is detected. In yet other embodiments, another gating mechanism may exist between the mobile platform 550 and the camera storage module 510 such that only when the detachable camera 530 is detected, does image information pass through the other gating mechanism and get transferred to the mobile platform 550. More information on the three approaches will be described in further detail below.

It should be appreciated that there may be many ways of implementing the gating mechanism 552, and the approach detailed below should be not read as limiting. In one approach, the gating mechanism 552 may comprise an external chip set that handles the image and/or video input that comes in through the AR device 62 to the VPU 512. This information is stored in a device driver that operates with the mobile platform 550. In one or more embodiments, the capability of freely retrieving data from the device driver may not be provided to the mobile platform 550 in order to segregate the images and/or video content. The device driver may be programmed such that the actual images and/or videos are not accessible by the mobile platform 550, in one or more embodiments.

In one or more embodiments, firmware that is built into the VPU 512 may be programmed such that it selectively transmits only geometry information to the mobile platform 550, unless the detachable camera 530 is detected. Thus, in one or more embodiments, the firmware controls the functionality, and no control is given to the device driver. This may be one approach to implement the gating mechanism 552, although other approaches may be similarly used to keep the images/videos separate from the mobile platform 550.

In some embodiments, the gating mechanism is designed such that the images and/or videos are not transferred even to the AR system's belt pack 70 or local processing module either, in addition to ensuring that the images and/or videos are not transferred to the cloud. In other words, such a gating mechanism ensures that even the individual AR device 62 does not carry any unwanted or private images or videos, except when the detachable camera 530 is detected. This provides yet another way to guarantee that the privacy and security of users of the AR device 62 is maintained.

Figure 7:
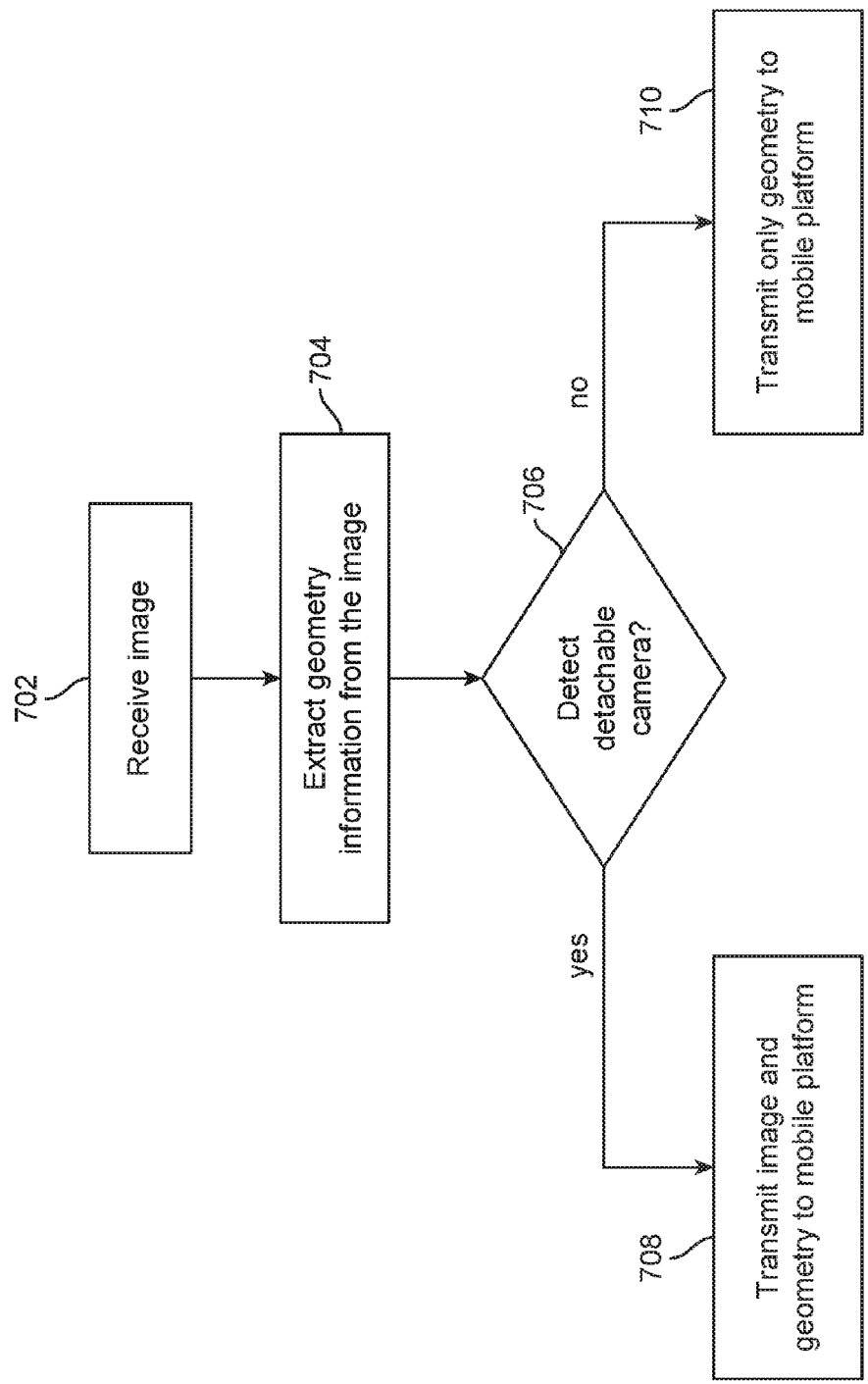
FIG. 7 is an example method of selectively allowing data to be transmitted to a mobile platform, according to one embodiment.

Referring now to FIG. 7, an example process flow of the VPU 512 is illustrated. At 702, an image may be received through one of the context providing devices. At 704, a geometry information may be extracted from the image. At 706, a determination is made whether the detachable camera 530 is detected. If the detachable camera 530 is detected, at 708, both the image and the geometry information is transmitted to the mobile platform 550. If the detachable camera 530 is not detected, at 710, only the geometry information is transmitted to the mobile platform 550.

Figure 8A:
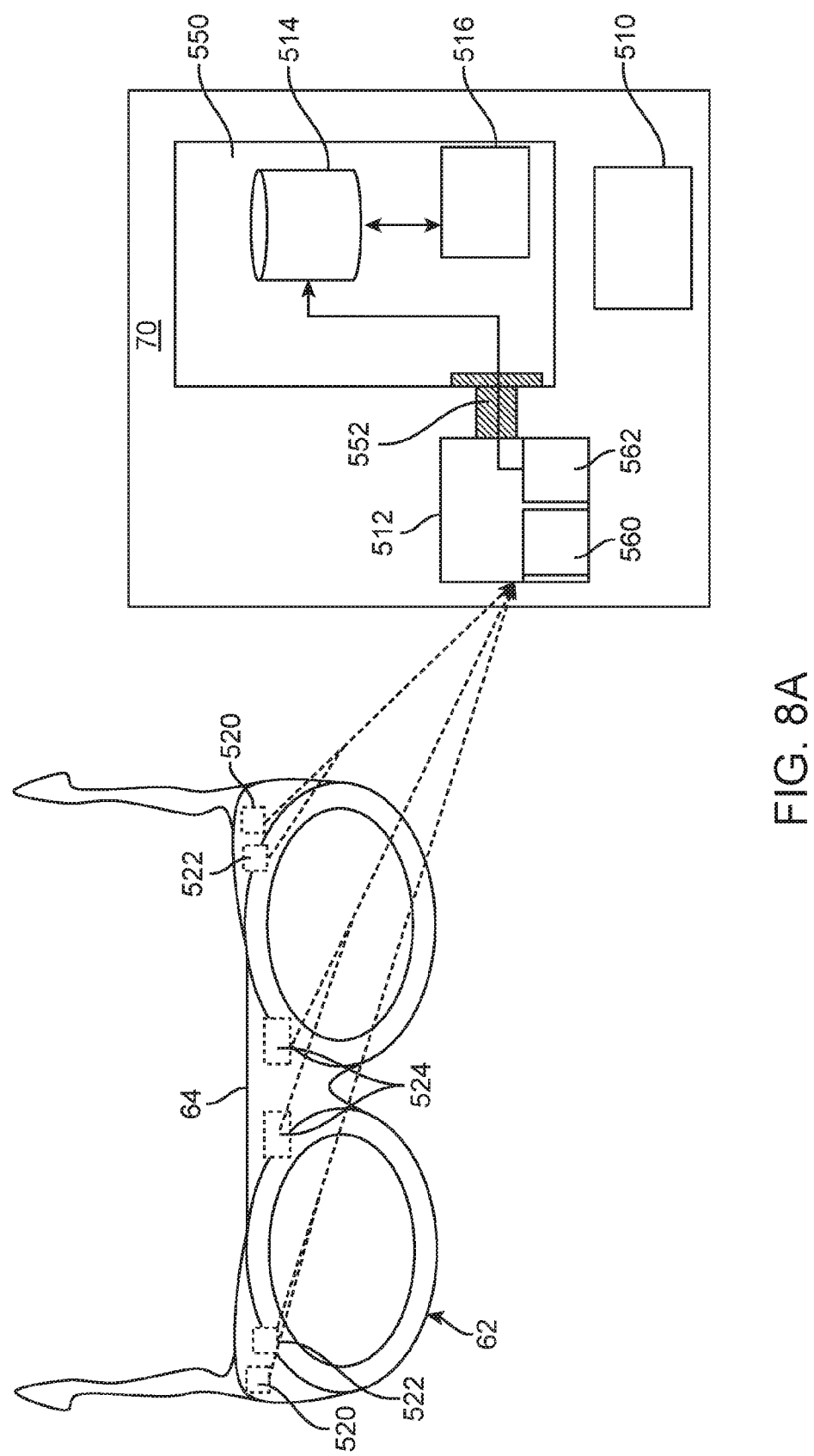
FIGS. 8A-8B illustrate a series of process flow diagrams depicting an example technique of selectively transmitting information to the mobile platform, according to one embodiment.
Figure 8B:
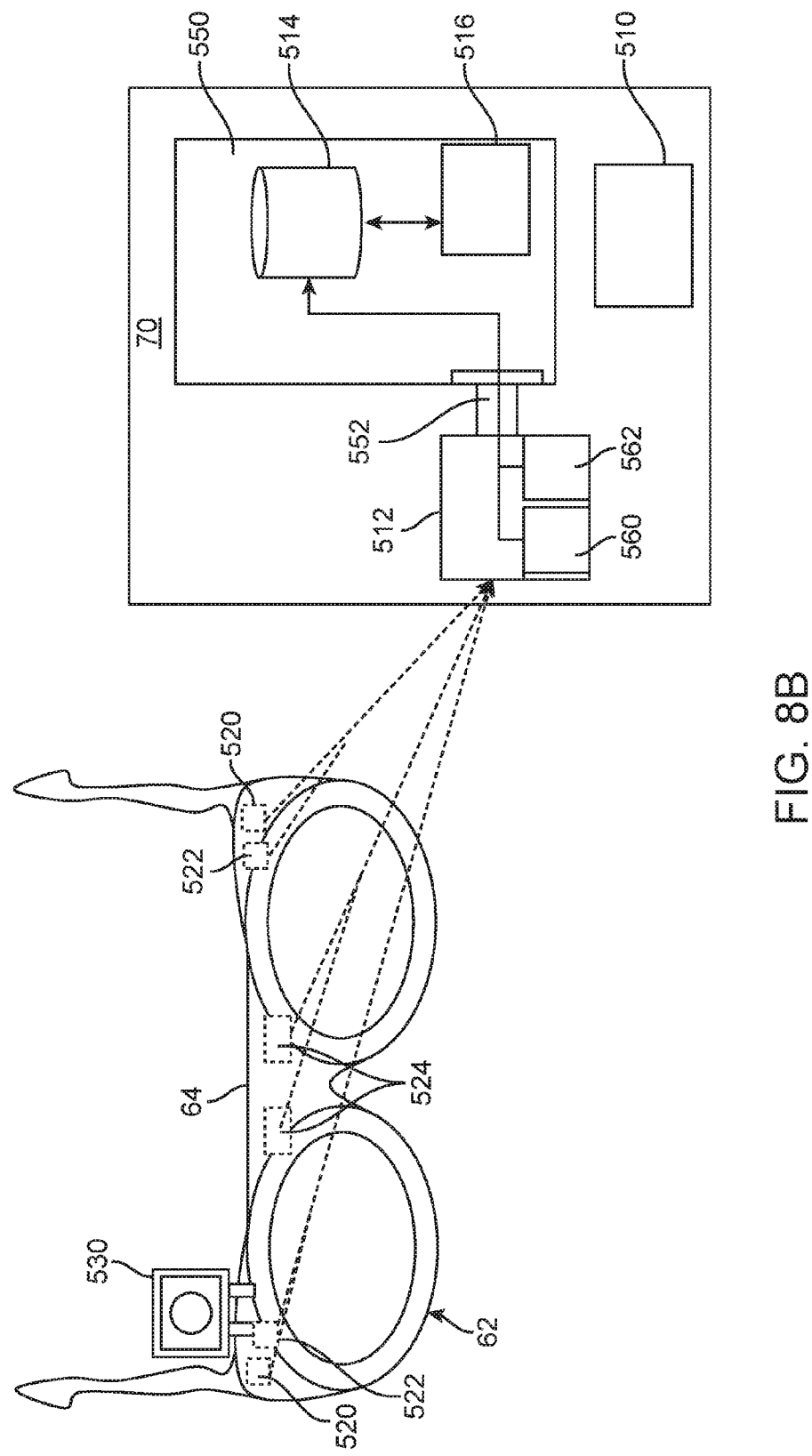

Referring now to FIGS. 8A-8B, an example process flow diagram is illustrated. In FIG. 8A, the detachable camera 530 is not affixed to the frame 64 of the AR device 62. The images and/or videos are stored in a storage module 560 of the VPU 512 (which may be timely deleted, in some embodiments). The VPU 512 may extract the geometry information from the images, and may store the geometry information in a separate storage module 562, in one or more embodiments. The images may be stored in storage module 560 (and timely deleted). As shown in FIG. 8A, since the detachable camera 530 is not detected, only the geometry information from 562 is provided to the mobile platform 550.

In FIG. 8B, once the detachable camera 530 has been detected, the gate 552 is "opened" and both the images stored in the storage module 560 and geometry information stored in storage module 562 are transmitted to the mobile platform 550. Thus, images captured through the detachable camera 530 are also stored in the storage module 560 and sent through the "open gate". In other embodiments, images captured through the detachable camera 530 may stored in the camera storage module 510, and may be transmitted to the mobile platform 550 through a separate gating mechanism, as discussed above. In other embodiments, the camera storage module 510 may freely transmit the images to the mobile platform 550 (since the camera storage module 510 only comprises images from the detachable camera 530 obtained through the user's consent).

Figure 9B:
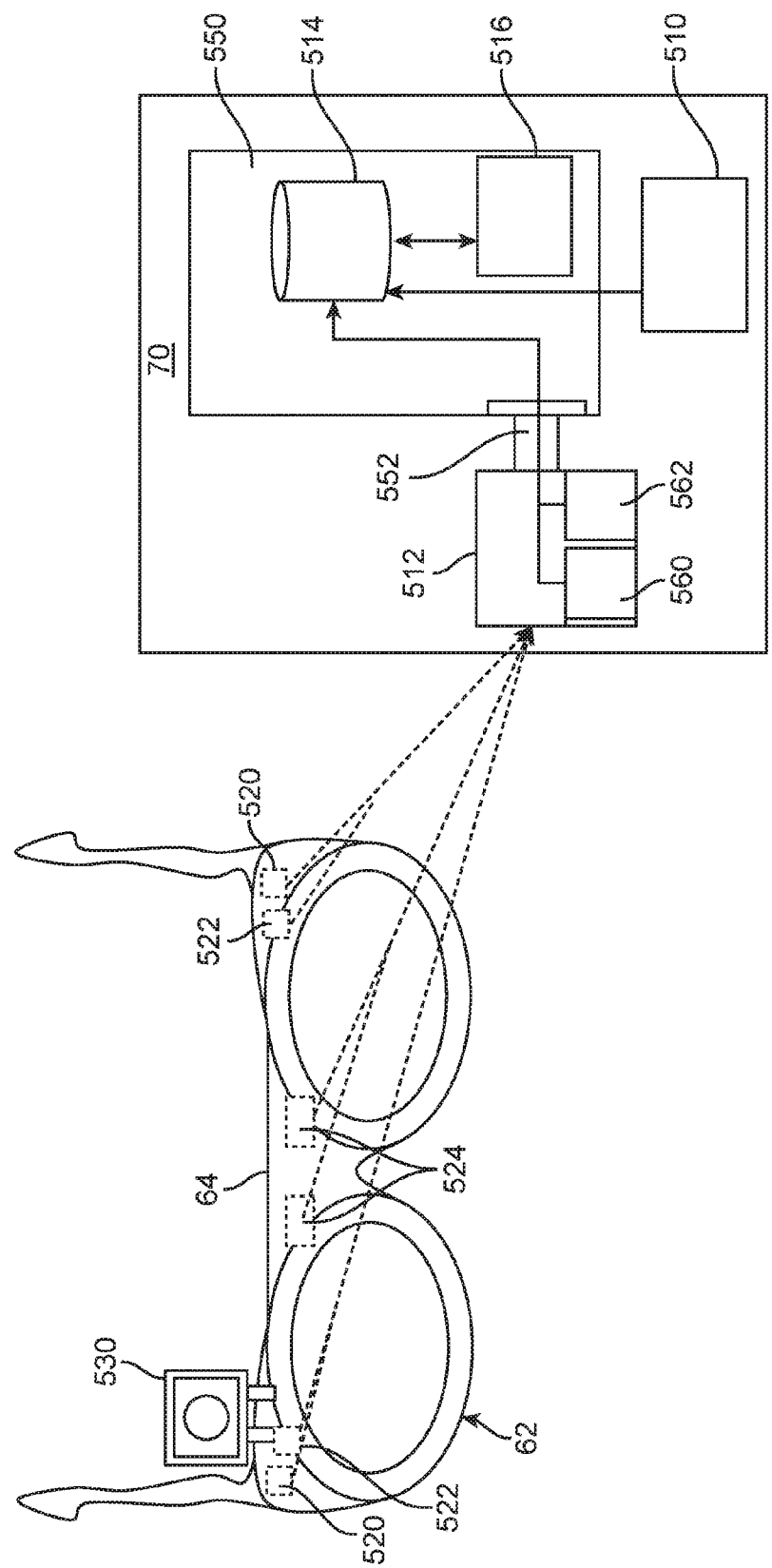

FIGS. 9A and 9B illustrate another possible system configuration. Similar to FIG. 8A, when the detachable camera 530 is not detected, the gating mechanism 552 only allows geometry information from 562 to be transmitted to the mobile platform 550. In FIG. 9B, when the detachable camera 530 is detected, the gate 552 is "opened", but the camera storage module 510 also directly transmits the images captured through the detachable camera 530 to the mobile platform 550, rather than going through the VPU 512. In this embodiment, data from the detachable camera 530 is stored in the storage module 510 and is directly communicated to the mobile platform 550, and the VPU 512 transmits images gathered from the other context devices through the gating mechanism 552. This may provide images of higher quality (e.g., captured through the detachable camera 530) to be transmitted to the mobile platform 550.

Figure 10A:
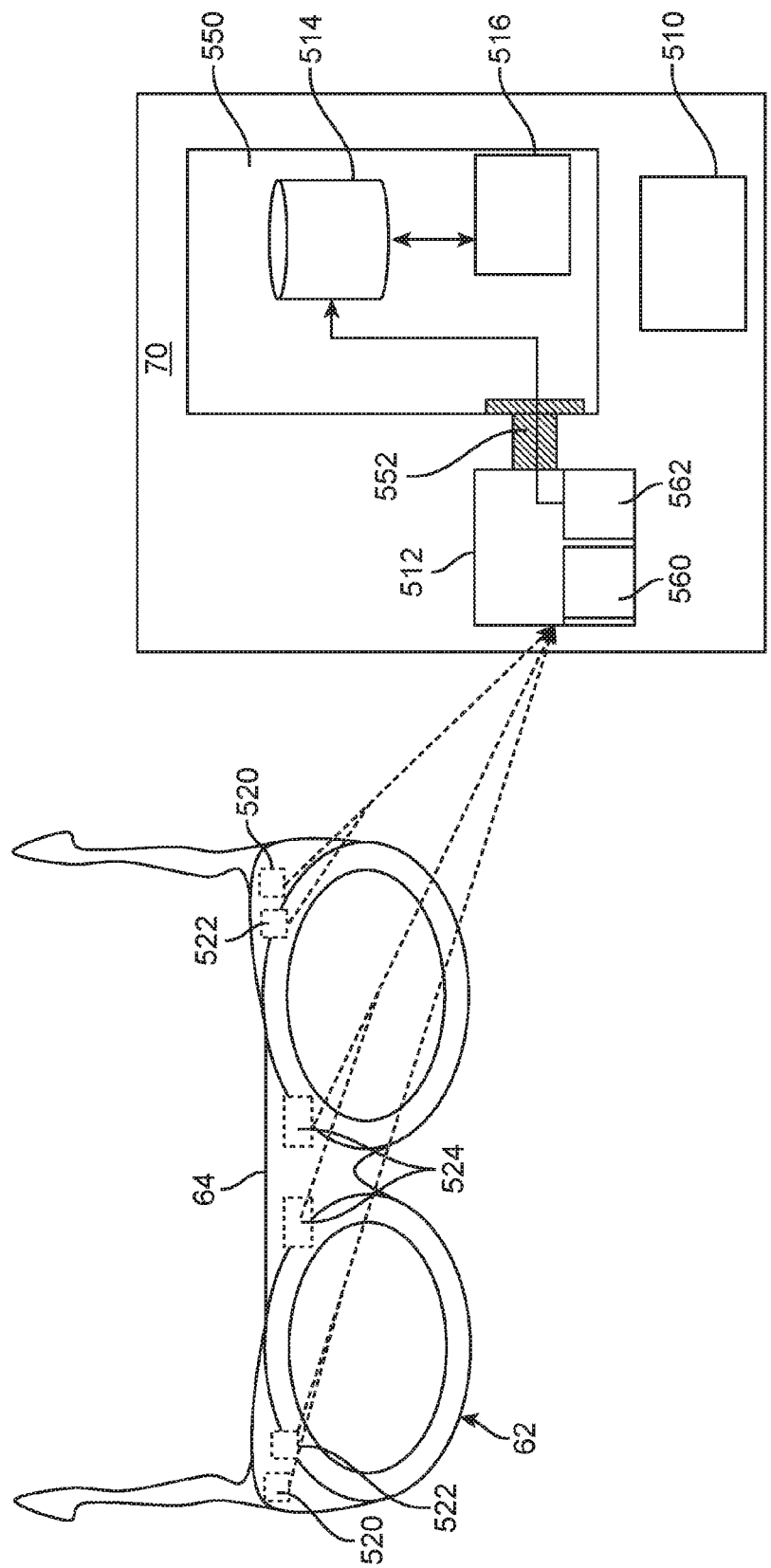
FIGS. 10A-10B illustrate another series of process flow diagrams depicting another example technique of selectively transmitting information to the mobile platform, according to one embodiment.
Figure 10B:
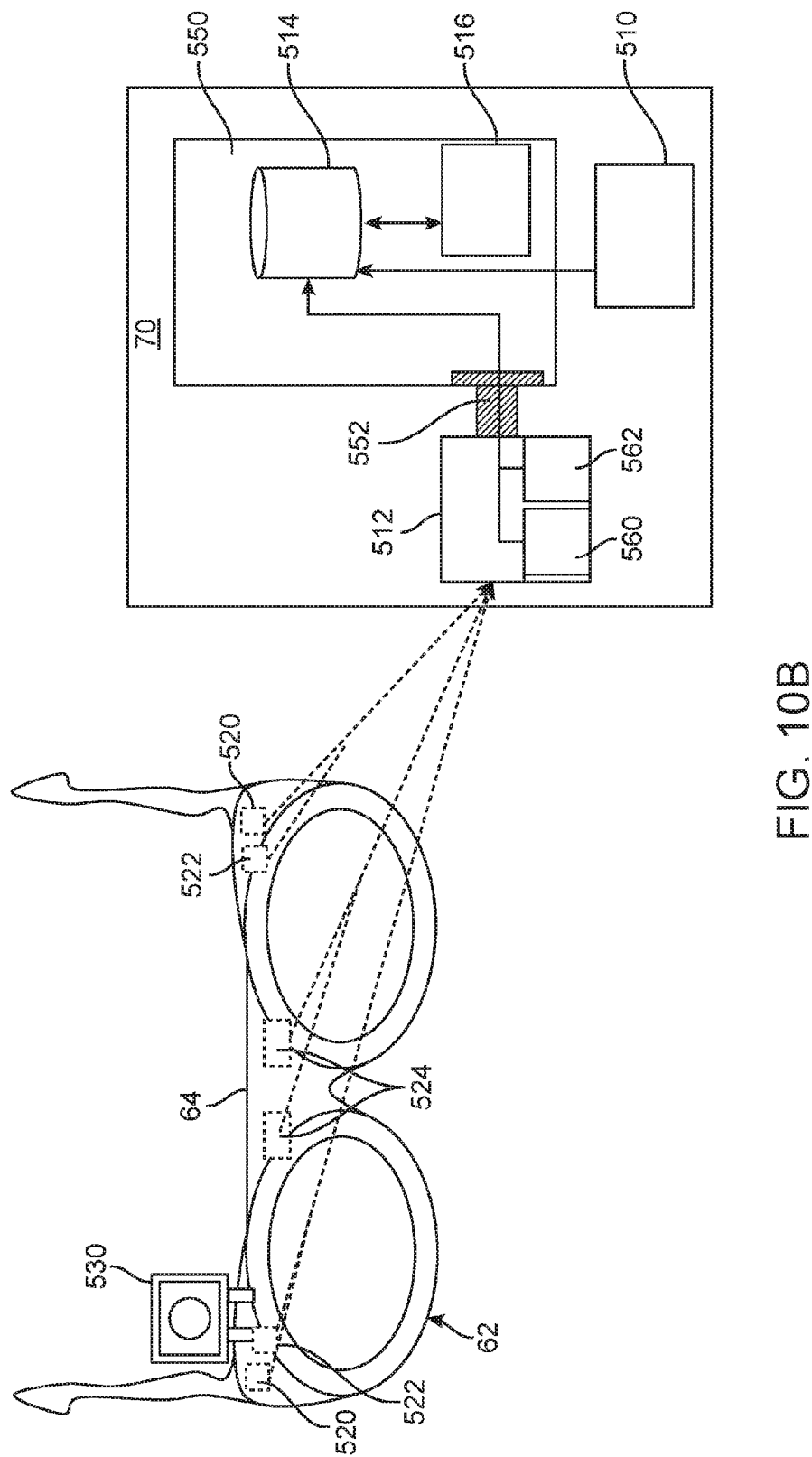

In yet another embodiment, only images captured through the detachable camera 530 are ever transmitted to the mobile platform 550. In other words, the gate 552 is never "opened". Referring to FIGS. 10A and 10B, when the detachable camera 530 is detected, the camera storage module 510 directly transmits the images and/or videos to the mobile platform 550, but as shown in FIG. 10B, even when the detachable camera 530 is detected, the gate is not "opened" and only geometry information captured through the context providing devices is transmitted to the mobile platform 550. In FIG. 10B, when the detachable camera 520 is detected, images are directly transferred to the mobile platform 550 through the camera storage module 510. In other words, the VPU 512 is only concerned with providing geometric information to the mobile platform 550, and the camera storage module 510 instead has another gating mechanism (not shown) that selectively allows for images to be transferred to the mobile platform 550.

Various exemplary embodiments of the invention are described herein. Reference is made to these examples in a non-limiting sense. They are provided to illustrate more broadly applicable aspects of the invention. Various changes may be made to the invention described and equivalents may be substituted without departing from the true spirit and scope of the invention. In addition, many modifications may be made to adapt a particular situation, material, composition of matter, process, process act(s) or step(s) to the objective(s), spirit or scope of the present invention. Further, as will be appreciated by those with skill in the art that each of the individual variations described and illustrated herein has discrete components and features which may be readily separated from or combined with the features of any of the other several embodiments without departing from the scope or spirit of the present invention. All such modifications are intended to be within the scope of claims associated with this disclosure.

The invention includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the invention, together with details regarding material selection and manufacture have been set forth above. As for other details of the present invention, these may be appreciated in connection with the above-referenced patents and publications as well as generally known or appreciated by those with skill in the art. The same may hold true with respect to method-based aspects of the invention in terms of additional acts as commonly or logically employed.

In addition, though the invention has been described in reference to several examples optionally incorporating various features, the invention is not to be limited to that which is described or indicated as contemplated with respect to each variation of the invention. Various changes may be made to the invention described and equivalents (whether recited herein or not included for the sake of some brevity) may be substituted without departing from the true spirit and scope of the invention. In addition, where a range of values is provided, it is understood that every intervening value, between the upper and lower limit of that range and any other stated or intervening value in that stated range, is encompassed within the invention.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present invention is not to be limited to the examples provided and/or the subject specification, but rather only by the scope of claim language associated with this disclosure.

The invention claimed is:

1. An augmented reality display system, comprising:
   a housing for one or more components for the augmented reality display system, wherein the one or more components comprises at least a spatial light modulator to project light associated with one or more virtual images to a user and a plurality of sensors to capture information pertaining to the user's surroundings, and wherein at least one sensor of the plurality of sensors is an image-based sensor;
   a processing module communicatively coupled to the housing to process a set of data retrieved from the plurality of sensors, wherein the processing module comprises a gating mechanism that selectively allows the set of data retrieved from the plurality of sensors to be transmitted to a mobile platform; and
   a detachable camera removably attached to the housing of the augmented reality display system, wherein the gating mechanism selectively allows the set of data retrieved from the plurality of sensors to pass through to the mobile platform based at least in part on whether the detachable camera is detected to be attached to the housing of the augmented reality display system.

2. The augmented reality display device of claim 1, wherein when the detachable camera is detected to be attached to the housing of the augmented reality display system, the gating mechanism allows the set of data to pass through to the mobile platform.

3. The augmented reality display system of claim 1, wherein when the detachable camera is not detected to be attached to the housing of the augmented reality display system, the gating mechanism allows only a portion of the set of data to pass through to the mobile platform.

4. The augmented reality display system of claim 1, wherein at least some of the set of data retrieved from the plurality of sensors corresponds to image or video data.

5. The augmented reality display system of claim 1, further comprising a Video Processing Unit ("VPU") that extracts geometric information from a set of images corresponding to the set of data retrieved from the plurality of sensors.

6. The augmented reality display system of claim 5, wherein, when the detachable camera is not detected to be attached to the housing of the augmented reality display system, the gating mechanism allows the geometric information to pass through to the mobile platform, but prevents the set of images from passing through to the mobile platform.

7. The augmented reality display system of claim 5, wherein, when the detachable camera is detected to be attached to the housing of the augmented reality display system, the gating mechanism allows the geometric information and the set of images captured when the detachable camera is detected to be attached to the augmented reality display system to pass through to the mobile platform.

8. The augmented reality display system of claim 5, wherein the geometric information corresponds to pose information pertaining to the set of images.

9. The augmented reality display system of claim 5, wherein the geometric information corresponds to 2D or 3D points pertaining to the set of images.

10. The augmented reality display system of claim 5, wherein the geometric information corresponds to depth information pertaining to the set of images.

11. The augmented reality display system of claim 5, wherein the geometric information is transmitted to a map database, the map database comprising coordinate information of real objects of the world, such that virtual content is displayed to the user in relation to the real objects of the world.

12. The augmented reality display system of claim 5, wherein the VPU comprises an image storage module to store images captured through the plurality of sensors.

13. The augmented reality display system of claim 5, wherein the VPU comprises a geometry storage module to store the geometric information pertaining to the images captured through the plurality of sensors.

14. The augmented reality display system of claim 5, wherein the gating mechanism allows geometric information to be passed through to the mobile platform even when the detachable camera is not detected to be attached to the housing of the augmented reality di splay system.

15. The augmented reality display system of claim 1, further comprising a camera storage module to store images captured through the detachable camera.

16. The augmented reality display system of claim 15, wherein, when the detachable camera is not detected to be attached to the housing of the augmented reality display system, the camera storage module does not transmit the images to mobile platform.

17. The augmented reality display system of claim 15, wherein, when the detachable camera is detected to be attached to the housing of the augmented reality display system, the camera storage module transmits the images captured while the detachable camera is detected to be attached to the mobile platform.

18. The augmented reality display system of claim 1, wherein the detachable camera comprises an indicator that signals that the detachable camera has been attached to the housing of the augmented reality display system.

19. The augmented reality display system of claim 18, wherein the indicator comprises a light that is turned on when the detachable camera has been attached to the housing of the augmented reality display system.

20. The augmented reality display system of claim 18, wherein the indicator is a shutter that physically opens or blocks the lens of the detachable camera.

21. The augmented reality display system of claim 1, wherein the detachable camera is a third-party camera.

22. The augmented reality display system of claim 1, wherein the detachable camera is electrically attached to the housing of the augmented reality device is an electrical means.

23. The augmented reality display system of claim 1, wherein the detachable camera is mechanically attached to the housing of the augmented reality device is a mechanical means.

24. The augmented reality display system of claim 1, further comprising an electrical contact that completes a circuit when the detachable camera is attached to the detachable camera to detect that the detachable camera has been attached to the housing of the augmented reality display system.

25. The augmented reality display system of claim 1, wherein the plurality of sensors comprises an IMU device.

26. The augmented reality display system of claim 1, wherein the plurality of sensors comprises an eye-tracking device.

27. The augmented reality display system of claim 1, wherein the plurality of sensors comprises a depth camera.

28. The augmented reality display system of claim 1, wherein the plurality of sensors comprises a field-of-view camera.

29. The augmented reality display system of claim 1, wherein the plurality of sensors comprises an infrared camera.

30. A method for displaying augmented reality, comprising:
    projecting, through a spatial light modulator, one or more virtual images to a user;
    capturing, through a plurality of sensors, a set of data pertaining to the user's surroundings, wherein the set of data includes an image;
    processing, through a processing module, the set of data retrieved from the plurality of sensors, the processing module comprising a gating mechanism that selectively allows the set of data retrieved from the plurality of sensors to be transmitted to a mobile platform;
    detecting whether a detachable camera is attached to a housing of the augmented reality device, wherein the gating mechanism selectively allows the set of data retrieved from the plurality of sensors to be transmitted to the mobile platform based at least in part on whether the detachable camera is detected to be attached to the housing of the augmented reality display system.

31. The method of claim 30, further comprising, when the detachable camera is detected to be attached to the housing of the augmented reality display system, the gating mechanism allowing the set of data to pass through to the mobile platform.

32. The method of claim 30, further comprising, when the detachable camera is not detected to be attached to the housing of the augmented reality display system, the gating mechanism allowing only a portion of the set of data to pass through to the mobile platform.

33. The method of claim 30, wherein at least some of the set of data retrieved from the plurality of sensors corresponds to image or video data.

34. The method of claim 30, further comprising extracting, through a Video Processing Unit ("VPU"), geometric information from a set of images corresponding to the set of data retrieved from the plurality of sensors.

35. The method of claim 34, further comprising, when the detachable camera is not detected to be attached to the housing of the augmented reality display system, the gating mechanism allowing the geometric information to pass through to the mobile platform.

36. The method of claim 34, further comprising, when the detachable camera is detected to be attached to the housing of the augmented reality display system, the gating mechanism allowing the geometric information and the set of images captured when the detachable camera is detected to be attached to the augmented reality display system to pass through to the mobile platform.

37. The method of claim 34, wherein the geometric information corresponds to pose information pertaining to the set of images.

38. The method of claim 34, wherein the geometric information corresponds to 2D or 3D points pertaining to the set of images.

39. The method of claim 34, wherein the geometric information corresponds to depth information pertaining to the set of images.

40. The method of claim 34, further comprising transmitting the geometric information to a map database, the map database comprising coordinate information of real objects of the world, such that virtual content is displayed to the user in relation to the real objects of the world.

41. The method of claim 34, wherein the VPU comprises an image storage module to store images captured through the plurality of sensors.

42. The method of claim 34, wherein the VPU comprises a geometry storage module to store the geometric information pertaining to the images captured through the plurality of sensors.

43. The method of claim 34, further comprising the gating mechanism allowing geometric information to be passed through to the mobile platform even when the detachable camera is not detected to be attached to the housing of the augmented reality display system.

44. The method of claim 30, further comprising storing images captured through the detachable camera in a camera storage module.

45. The method of claim 44, wherein, when the detachable camera is not detected to be attached to the housing of the augmented reality display system, the camera storage module does not transmit the images to mobile platform.

46. The method of claim 44, further comprising, when the detachable camera is detected to be attached to the housing of the augmented reality display system, the camera storage module transmitting the images captured while the detachable camera is detected to be attached to the mobile platform.

47. The method of claim 30, wherein the detachable camera comprises an indicator that signals that the detachable camera has been attached to the housing of the augmented reality display system.

48. The method of claim 47, wherein the indicator comprises a light that is turned on when the detachable camera has been attached to the housing of the augmented reality display system.

49. The method of claim 47, wherein the indicator comprises a shutter that physically opens or blocks the lens of the detachable camera.

50. The method of claim 30, further comprising electrically attaching the detachable camera to the housing of the augmented reality device.

51. The method of claim 30, further comprising mechanically attaching the detachable camera to the housing of the augmented reality device.

52. The method of claim 30, further comprising detecting the detachable camera based at least in part on an electrical contact that completes a circuit when the detachable camera is attached to the detachable camera.

* * * * *